United States Patent
Rood et al.

(10) Patent No.: US 11,230,296 B2
(45) Date of Patent: Jan. 25, 2022

(54) APPARATUS AND METHOD FOR PERFORMING ON-BOARD SELF DIAGNOSTICS FOR A HEAVY-DUTY VEHICLE

(71) Applicant: Shem, LLC, Highland Park, IL (US)

(72) Inventors: Chris Rood, Trussville, AL (US); Juan Higgs, Birmingham, AL (US)

(73) Assignee: Shem, LLC, Highland Park, IL (US)

( * ) Notice: Subject to any disclaimer, the term of this patent is extended or adjusted under 35 U.S.C. 154(b) by 234 days.

(21) Appl. No.: 16/431,292

(22) Filed: Jun. 4, 2019

(65) Prior Publication Data

US 2020/0385009 A1 Dec. 10, 2020

(51) Int. Cl.
| | |
|---|---|
| *B60W 50/02* | (2012.01) |
| *G07C 5/08* | (2006.01) |
| *G07C 5/00* | (2006.01) |
| *G05B 23/02* | (2006.01) |

(52) U.S. Cl.
CPC ......... *B60W 50/0205* (2013.01); *G07C 5/006* (2013.01); *G07C 5/0808* (2013.01); *G07C 5/0825* (2013.01); *G05B 23/0205* (2013.01); *G05B 23/0248* (2013.01)

(58) Field of Classification Search
CPC . B60W 50/0205; G07C 5/006; G07C 5/0808; G07C 5/0825; G05B 23/0205; G05B 23/0248
See application file for complete search history.

(56) References Cited

U.S. PATENT DOCUMENTS

| | | | |
|---|---|---|---|
| 6,212,449 B1 | 4/2001 | Wellman et al. | |
| 8,315,760 B2 * | 11/2012 | Costantino | ........ G06F 16/24573 701/32.1 |
| 9,658,271 B2 | 5/2017 | Thomas et al. | |
| 10,055,907 B2 | 8/2018 | Rood | |
| 2008/0157718 A1* | 7/2008 | Ohnuki | .................. H02J 7/0021 320/134 |
| 2009/0013758 A1* | 1/2009 | Baumann | ........... G01N 15/0606 73/23.33 |

(Continued)

FOREIGN PATENT DOCUMENTS

| | | | | |
|---|---|---|---|---|
| CN | 102405334 A | * | 4/2012 | ............. F01N 3/106 |
| CN | 104141785 A | * | 11/2014 | |

(Continued)

*Primary Examiner* — Hunter B Lonsberry
*Assistant Examiner* — Jay Khandpur
(74) *Attorney, Agent, or Firm* — Brooks Kushman P.C.

(57) ABSTRACT

In at least one embodiment, a class 7 or 8 vehicle is provided. A first controller is configured to control a vehicle operation and to detect one or more failures related to the vehicle operation. The first controller is configured to transmit first data indicative of the one or more failures. A vehicle interface controller is configured to receive the first data indicative of the one or more failures on the data communication bus and to receive a signal corresponding to at least one of vehicle speed or park brake status. The vehicle interface controller is further configured to retrieve at least one diagnostic screen and to display the at least one diagnostic screen after the signal indicates the at least one of the vehicle speed being equal to a predetermined vehicle speed or the park brake status indicating that a park brake is set in the vehicle.

20 Claims, 17 Drawing Sheets

(56) References Cited

U.S. PATENT DOCUMENTS

| | | | | |
|---|---|---|---|---|
| 2011/0130916 A1* | 6/2011 | Mayer | ............... | G08G 1/127 |
| | | | | 701/31.4 |
| 2016/0186413 A1* | 6/2016 | Tanaka | ............... | E02F 9/267 |
| | | | | 701/29.1 |
| 2016/0202302 A1 | 7/2016 | Cooper et al. | | |
| 2017/0365111 A1* | 12/2017 | Dudar | ............... | B60R 1/12 |
| 2018/0326850 A1* | 11/2018 | Recktenwald | ............... | B60K 37/06 |
| 2018/0345885 A1* | 12/2018 | Seger | ............... | F02B 77/084 |

FOREIGN PATENT DOCUMENTS

| | | |
|---|---|---|
| EP | 3252719 A1 | 12/2017 |
| WO | 2018140361 A1 | 8/2018 |

\* cited by examiner

APPARATUS AND METHOD FOR PERFORMING ON-BOARD SELF DIAGNOSTICS FOR A HEAVY-DUTY VEHICLE

TECHNICAL FIELD

Aspects disclosed herein generally relate to an apparatus and method for performing on-board self-diagnostics for a heavy-duty vehicle. These aspects and others will be discussed in more detail herein.

BACKGROUND

U.S. Pat. No. 10,055,907 to Rood provides a vehicle that includes a chassis, wheels, a drivetrain including an engine and a transmission, and a brake system. The vehicle also has a vehicle control system that includes controllers for the engine, the transmission controller, and the brake system, a vehicle network connected to the controllers to permit communication to and from these components, and a primary vehicle controller connected to the network and configured to communicate with the controllers. The vehicle further includes a vehicle diagnostic system that is connected to the network and configured to communicate with the various controllers. The diagnostic system is configured to operate in a diagnostic mode, in which the diagnostic system is configured to display diagnostic information from one or more of the controllers. The diagnostic system may further be configured to operate in a display mode, where the vehicle diagnostic system is configured to display operating information regarding the vehicle.

SUMMARY

In at least one embodiment, a class 7 or 8 vehicle is provided. The vehicle includes a data communication bus, a first controller and a vehicle interface controller. The first controller is configured to control a vehicle operation and detect one or more failures related to the vehicle operation. The first controller is further configured to transmit first data indicative of the one or more failures. The vehicle interface controller includes memory and is configured to receive the first data indicative of the one or more failures on the data communication bus and receive a signal corresponding to at least one of vehicle speed or park brake status. The vehicle interface controller is further configured to access the memory to retrieve at least one diagnostic screen that corresponds to the one or more failures indicated on the first data and to display the at least one diagnostic screen after the signal indicates the at least one of the vehicle speed being equal to a predetermined vehicle speed or the park brake status indicating that a park brake is set in the vehicle.

In at least another embodiment, an apparatus for use in a vehicle is provided. The apparatus includes memory and a vehicle interface controller. The vehicle interface controller includes the memory and is configured to receive first data indicative of one or more failures related to a vehicle operation on a data communication bus from a first controller that controls a vehicle operation and that detects the one or more failures related to the vehicle operation and receive a signal corresponding to at least one of vehicle speed or park brake status. The vehicle interface controller is further configured to access the memory to retrieve at least one diagnostic screen that corresponds to the one or more failures indicated on the first data and to display the at least one diagnostic screen after the signal indicates the at least one of the vehicle speed being equal to a predetermined vehicle speed or the park brake status indicating that a park brake is set in the vehicle.

In at least another embodiment, a computer-program product embodied in a non-transitory computer read-able medium that is programmed for providing diagnostics in a vehicle is provided. The computer-program product includes instructions for receiving first data indicative of one or more failures related to a vehicle operation on a data communication bus from a first controller that controls a vehicle operation and that detects the one or more failures related to the vehicle operation and for receiving a signal corresponding to at least one of vehicle speed or park brake status; accessing a look up table to retrieve at least one diagnostic screen that corresponds to the one or more failures indicated on the first data. The computer-program product further includes instructions for displaying the at least one diagnostic screen after the signal indicates at least one of the vehicle speed being equal to a predetermined vehicle speed or the park brake status indicating that a park brake is set in the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
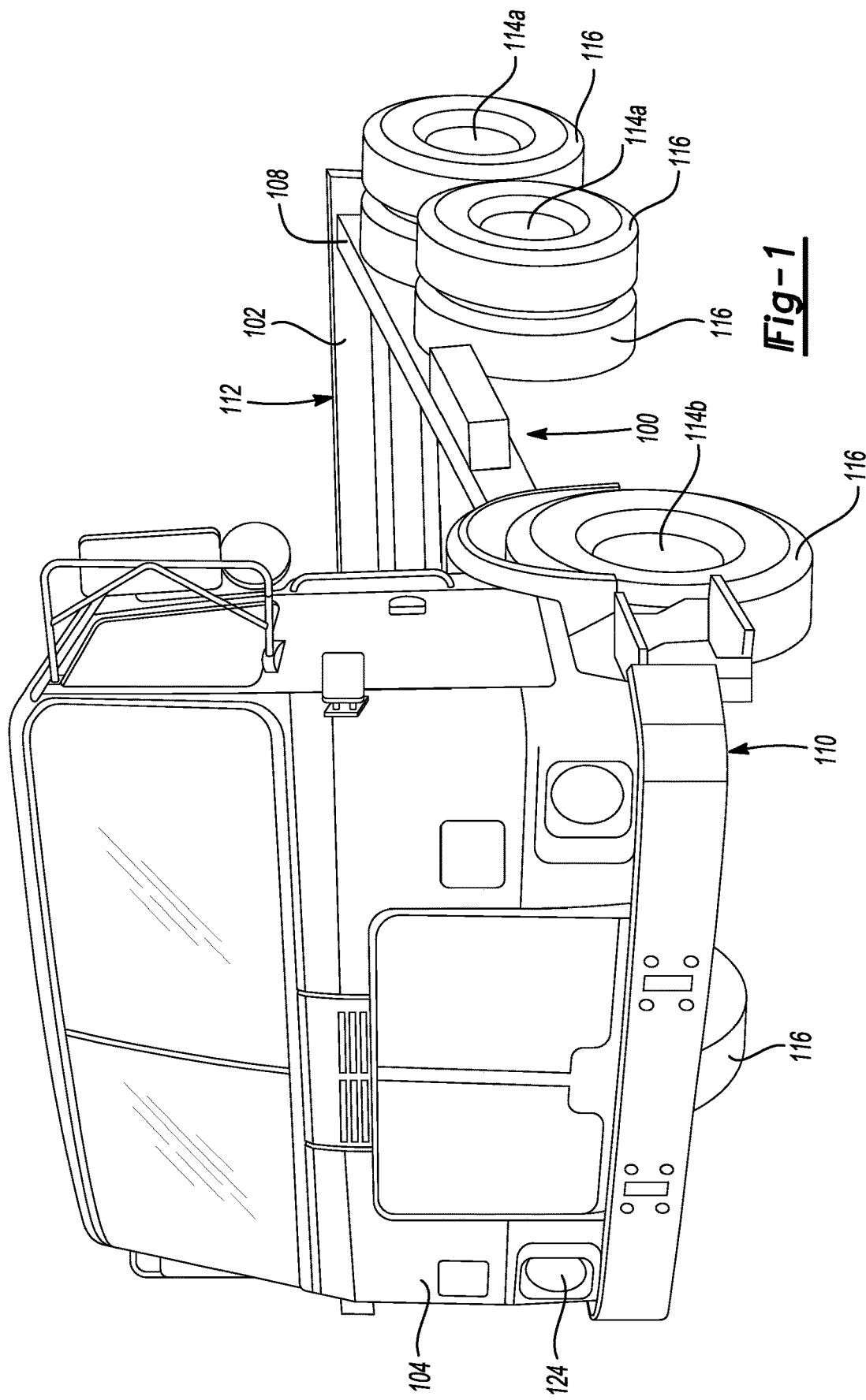
FIG. 1 generally depicts a perspective view of a vehicle in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controller(s) or display(s) as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controller(s) or display(s) as disclosed utilize one or more microprocessors to execute a computer-program that is embodied in a non-transitory computer readable medium that is programmed to perform any number of the functions as disclosed. Further, the controller(s) or display(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) or display(s) as disclosed also include hardware-based inputs and outputs for receiving and transmitting data, respectively from and to other hardware-based devices as discussed herein.

Embodiments disclosed herein generally enable the serviceability of the vehicles easier and quicker. Class 7 and class 8 vehicles generally operate in an extremely harsh environment. The refuse industry by nature is very dirty and leads to harsh use of equipment due to many factors such as the impact on a chassis of the vehicle that the body functions create as well as the complicated driving conditions present for these trucks while driving through a landfill. These factors and many others that result from the harsh environment often lead to unplanned or undesired electrical issues that are difficult to troubleshoot, especially for a new technician or a technician working on the vehicle that is not familiar with the design.

The embodiments disclosed herein provide on-board alerts whenever an issue is detected as well as data (or information) and instructions to assist in identifying the manner to resolve these issues quickly by providing all the relevant information that is needed by a technician to troubleshoot the fault or failure.

Aspects disclosed herein generally provide, but not limited to, the ability for a system (or apparatus) to detect a fault via electronic feedback in a vehicle control system and to provide alerts and instructions on a vehicle interface display to assist in correcting the issue or fault with the vehicle. When a fault is detected, the vehicle interface display may display a warning that is relevant to the detected fault on a display screen thereof. When the vehicle is parked, an end user may then view a relevant schematic page that is tied to the detected fault. The schematic page (or schematic screen) may present all relevant information tied to the fault, including a circuit schematic, wire routing, and all relevant input and output (I/O) status information running through the control system to fix the suspect circuit or affected electrical device. Additionally, the vehicle interface display may also be connected to any number of vehicle fuse boxes. The vehicle interface display may provide (or depict) detailed information on the fuse box configuration as well as status information for when a fuse is detected as being blown or missing.

In addition, the vehicle interface display may include any number of screen options for displaying gauge information. On each of these screens, a gauge parameter may be detected that is out of an acceptable parameter range, and the vehicle interface display provides a warning in response to detecting an out of range electrical or gauge parameter. A gauge may display on the screen of the vehicle interface display indicating the parameter status, regardless of what visual style is selected. Additionally, the vehicle interface display may also provide a no distraction mode. In the no distraction mode, the vehicle interface display may not depict any gauge data unless a parameter is detected to be outside of an acceptable parameter range. This condition may reduce any distractions or information overload for a driver (while driving) when there are no parameters that specifically need to be paid attention to. As soon as a parameter enters a warning area (or exceeds the acceptable parameter range), the vehicle interface display may display the gauge information that corresponds to a fault or failure and will not disappear until the fault has been addressed and the parameter has shifted back to the acceptable range. These aspects and other will be discussed in more detail.

FIG. 1 generally depicts a perspective view of a vehicle 100 in accordance to one embodiment. The vehicle 100 may be implemented as a class 7 or class 8 vehicle. In one example, the vehicle 100 may be a refuse or recycling collection truck and is provided with an automatic or manual sideloader body, a front-end loader body, a rear loader body, a roll off or hook lift body, or a manual sort body. The refuse or recycling collection bodies may or may not incorporate a compacting function. In another example, the vehicle 100 may be a refueling truck, for example, for use in aviation refueling, and is provided with a refueling body. In other examples, the vehicle 100 may be a truck with another body, such as a crane carrying body, a traffic paint striping body, a street sweeper body, a concrete pumping body, or the like.

Figure 2:
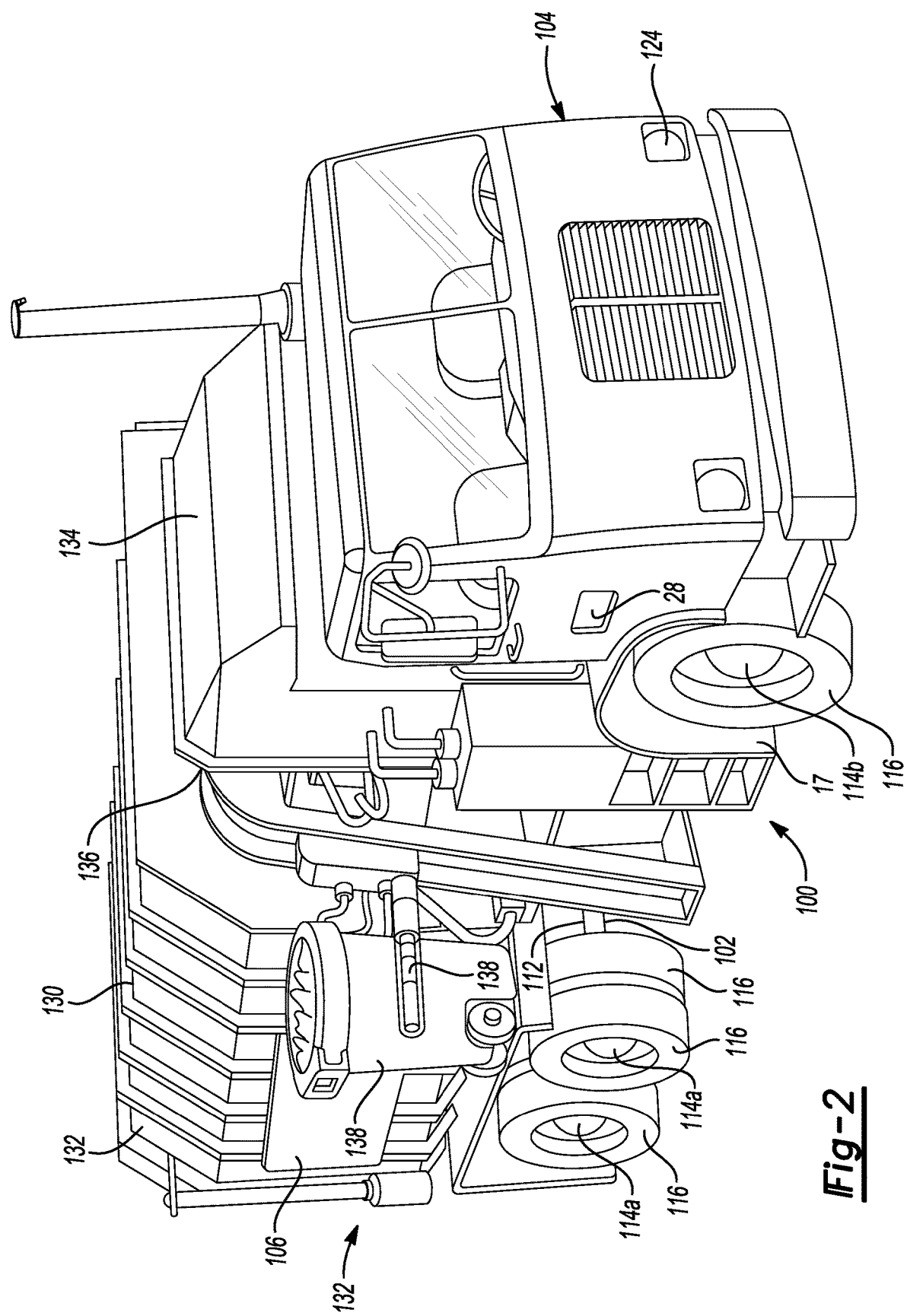
FIG. 2 generally depicts a perspective view of the vehicle of FIG. 1 with a body connect to the vehicle, in the form of a refuse truck in accordance to one embodiment.
Figure 3:
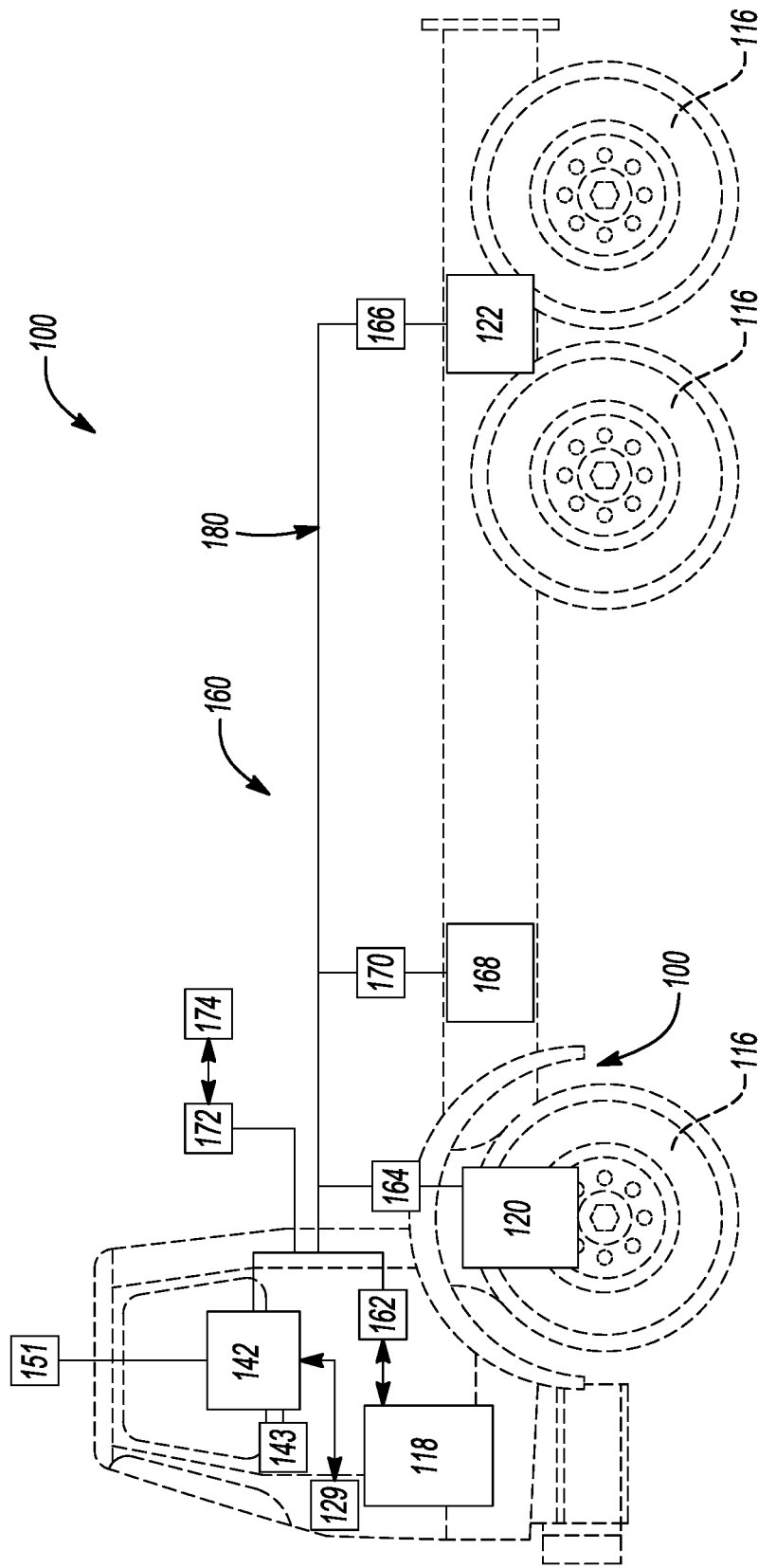
FIG. 3 generally depicts an electrical system of the vehicle in accordance to one embodiment.

The vehicle 100 generally includes a chassis 102. The chassis 102 may support an operator cab 104 and a vehicle body 106 (see FIG. 2 for vehicle body 106). When assembled, the body 106 and the operator cab 104 may be mounted on the chassis 102. The chassis 102 may be a truck chassis that includes frame members or rail members 108, and the chassis 102 has a front portion 110 for supporting the operator cab 104 and a rear portion 112 for supporting the body 106. In one embodiment, the rail members 108 may be formed of steel and are generally rectangular in cross-section (e.g., a C-section). The rail members 108 may extend substantially the entire length of the chassis 102 in one embodiment. The rail members 108 may serve as points of support and/or connection for rear axles 114a, the body 106, and the cab 104 and other components. The chassis 102 includes one or more rear axles 114a and a front axle 114b which in turn are attached to wheels 116 for movement of the chassis 102 along a surface. Additionally, as shown in FIG. 3, the vehicle 100 includes a drivetrain that includes an engine 118 (or engine system) connected to a transmission 120 (both shown schematically) (or transmission system) configured to transfer power to at least one of the wheels 116. The transmission 120 may be connected to one or both rear wheels 116. It is understood that the transmission 120 may be connected to transfer power directly to any number of the wheels 116, including, additionally or alternately, one or more of the front wheels 116 in some embodiments. It is understood that the transmission 120 may allow shifting between several settings (e.g. D, N, R) and several gears (e.g. various forward-drive gear ratios). Additional components connected to the engine 118 may be included as well, including an exhaust pipe, an air cleaner assembly, etc. The vehicle 100 may further include components such as a brake system 122, e.g., an anti-lock brake system (ABS) or air brake system, which is connected to the wheels 116 and configured to slow and stop the vehicle 100 from rolling, as well as a lighting system 124, which may include various lights, blinkers, side markers, etc.

The chassis 102 may receive several different configurations of the body 106, having various functionalities. As illustrated in FIG. 2, in an exemplary embodiment for a refuse truck, the body 106 includes a storage area 130, a loading area 132, a reception area 134, an open hopper 136 and a moveable arm 138. Refuse may be loaded in the reception area 134 by use of the arm 138. Refuse is stored in the storage area 130 and generally compacted within the body 106. It is recognized that other bodies for different purposes such as front loaders, rear loaders, dump trucks, straight trucks, cement trucks, pumpers, sweepers and other applications may be used in connection with the disclosed embodiments. Numerous components of the body 106 are capable of being adjusted, manipulated or otherwise actuated such as lifting the axles, manipulating the arm 138, opening the hopper 136, and compacting.

Figure 4:
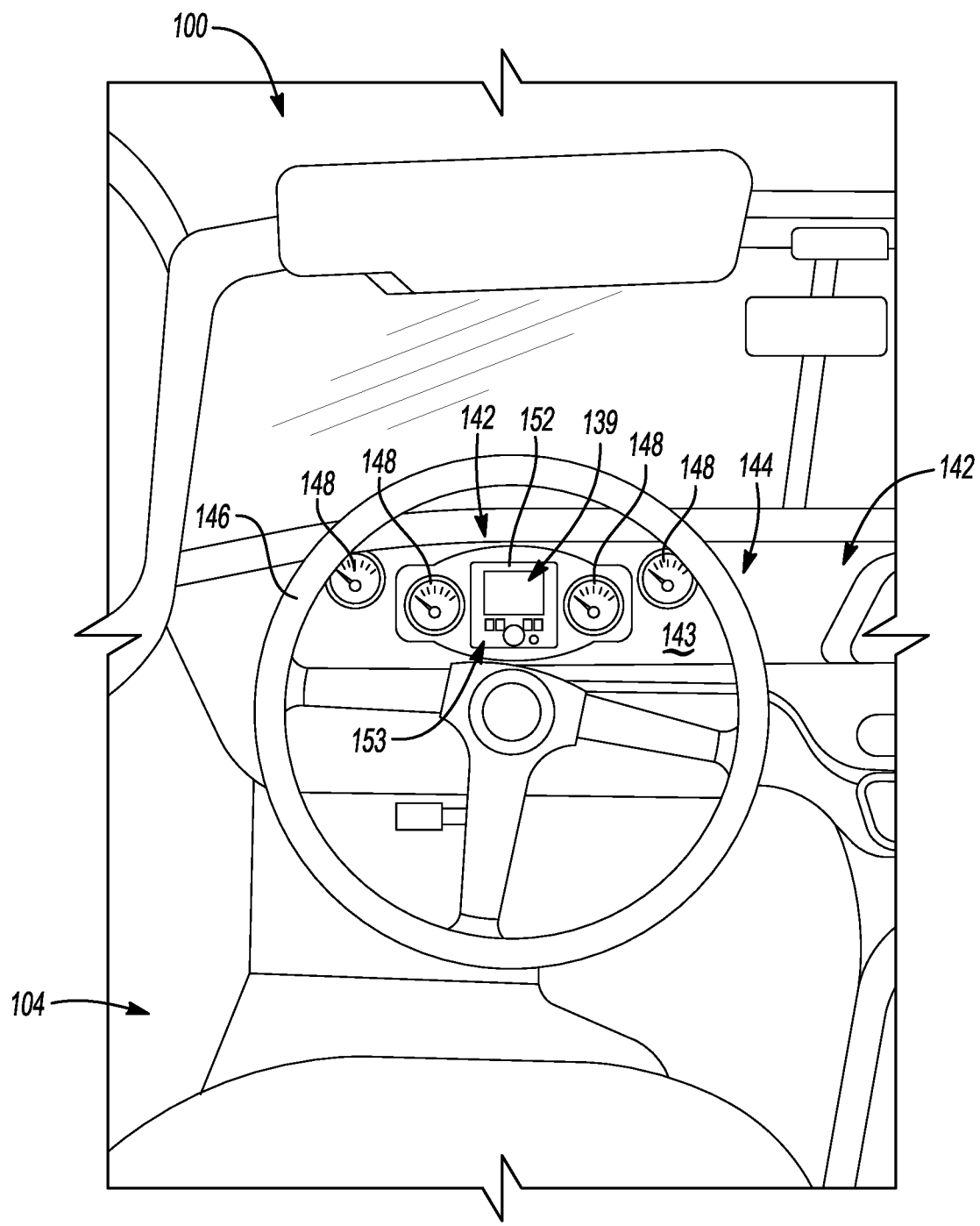
FIG. 4 generally depicts a plan view of an operator area of the vehicle in accordance to one embodiment.

The operator cab 104 generally includes a passenger area having both a left area and a right area. The vehicle 100 may be operable in a left and/or right-hand drive configuration, and may be switchable between such configurations. The left and right areas may be configured for one or more operators or passengers, depending on the drive configuration. As shown in FIG. 4, the operator cab 104 may also include a vehicle interface display 142 (or vehicle interface controller 142 including a display 139), controls 143 for operating and monitoring the vehicle 100, some of which may be located on a dashboard 144 or on a steering wheel 146) and/or various gauges/meters 148. It is recognized that various controls may also be positioned on the vehicle interface display 142. The vehicle interface display 142 may include a user interface 152 configured to directly receive touch input from a user input to control various aspects of the vehicle 100. Additional switches 153 may be positioned on the vehicle interface display 142 to facilitate user selection of aspects on the display 139. Controls 143 may be provided which also include various switches, etc., including for example an ignition switch, a speedometer and/or other monitors, and a transmission control (e.g. a stick or a push-button control), which may be located on or in the dashboard 144 and/or a console separating the left and right areas of the cab 104. The controls 143 may further include actuators for a main or service braking system, which may be air brakes in one embodiment, a parking brake system, or a throttle (e.g., an accelerator), as well as controls for lifting the axles, manipulating the arm 138, opening the hopper 136, compacting, etc. At least some of such controls 143 may be integrated into and/or controlled by a vehicle control system, as described herein.

The vehicle 100 generally includes a vehicle control system 160 (see FIG. 3), which includes the vehicle interface display 142 (with instrumentation 129), as well as various controllers configured for controlling specific components of the vehicle 100. For example, in one embodiment as shown in FIG. 3, the vehicle control system 160 may include an engine controller 162 configured to control the engine 118, a transmission controller 164 configured to control the transmission 120, and a brake controller 166 configured to control the brake system 122 of the vehicle 100. In other embodiments, the vehicle control system 160 may include additional or alternate controllers that are configured to control other components of the vehicle 100. For example, if the vehicle 100 has a compressed natural gas (CNG) fuel system 168, the vehicle 100 may also include a fuel controller 170 to control the fuel system 168. Additionally, the vehicle control system 160 may include other controllers, such a body controller 172 to control body control features 174 (e.g., vehicle interior and/or exterior lighting, power windows, locking, etc.). In one example, the body controller 172 and the body control features 174 may collectively comprise a body control system, a global position system (GPS) data monitoring system, etc. A fuse box 151 is electrically coupled to the vehicle interface display 142. The vehicle interface display 142 monitors the electrical characteristics of the fuse box and is configured to provide a fuse fault detail screen which will be discussed in more detail in connection with FIGS. 9 and 10. The vehicle 100 may also include a data communication bus 180 that is generally in communication with the various components of the vehicle control system 160, including the various controllers 142, 162, 164, 166, and 170, allowing the controllers 142, 162, 164, 166, and 170 of the control system 160 to communicate with each other and with other systems. The data communication bus 180 may be implemented as a J1939 data bus network. In one example, the bus 180 may be implemented as a medium speed Controller Area Network (MS-CAN), high speed CAN bus, or a combination of both. It is recognized that the type of bus 180 implemented in the vehicle 100 may vary. The vehicle control system 160 may also be connected to various instrumentation 129 (e.g., or other gauges) not directly positioned on the vehicle interface display 142. Such instrumentation 129 may be positioned in the various areas of the dashboard 144.

Figure 5:
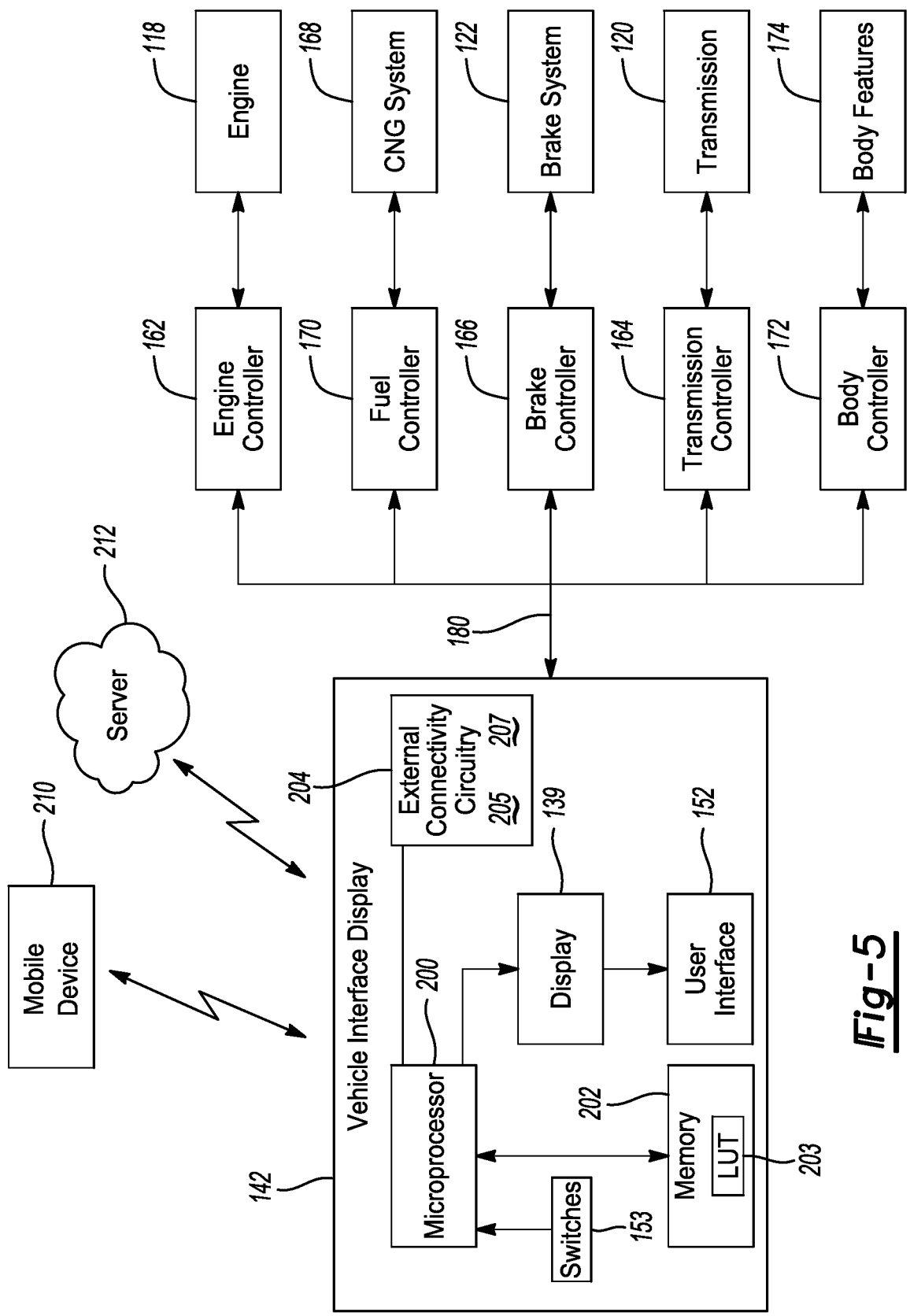
FIG. 5 generally depicts a more detailed view of the electrical system of FIG. 4 in accordance to one embodiment.

FIG. 5 generally depicts a more detailed view of the vehicle interface display 142 of the vehicle control system 160 of FIG. 4 in accordance to one embodiment. The vehicle interface display 142 generally includes the display 139, the user interface 152, the switches 153, a microprocessor 200, memory 202, and an external connectivity circuitry 204. It is recognized that the number of microprocessors implemented in the vehicle interface display 142 may vary based on a particular criterion of a given implementation. The microprocessor 200 is generally configured to execute any number of instructions to perform any and all functions as described herein as performed by the vehicle interface display 142. In one example, the vehicle interface display 142 may be referred to as a primary diagnostic controller since the vehicle interface display 142 is arranged to provide visual/audible information to the driver or technician. For example, the vehicle interface display 142 may provide diagnostic information related to all of the corresponding systems (e.g., 118, 120, 122, 168, 174) in the vehicle 100 for the driver or technician.

It is recognized that the vehicle interface display 142 and each corresponding controller 162, 164, 166, 170, and 172 may enter into a diagnostic mode for purposes of monitoring various input/outputs for each of their corresponding systems (e.g., 118, 122, 120, 168, 174) in an effort to communicate any detected faults thereof to a driver (or technician). Thus, each of the controllers 162, 164, 166, 170, and 172 may communicate diagnostic trouble code (DTCs) that correspond to detected failures to the vehicle interface display 142 over the data communication bus 180. In response to such DTCs, the vehicle interface display 142 may visually and/or audibly provide information related to such failures to the driver or technician. Such information may correspond not only to a type of failure (e.g., system fault: marker lights), but a screen shot of the input/output (I/O) for a given system 118, 120, 122, 168, 174), a wiring schematic with respect to the electrical distribution system and the corresponding routing for the wiring for the given system 118, 120, 122, 168, and 174; and/or a visual layout of a one or more fuse boxes in the vehicle 100 that visually depicts faults with missing or blown fuses. These aspects and more will be discussed in more detail in connection with FIGS. 7-8 and 10.

It is recognized that one or more of the other controllers 162, 164, 166, 170, and 172 may serve as a primary diagnostic controller and transmit the information corresponding to the detected faults to the vehicle interface display 142 for display thereon. For example, any one of the controllers 162, 164, 166, 170, and 172 may transmit the information corresponding to the detected faults (e.g., screen shot of I/O, wiring schematic, fuse box layout, etc.) via the data communication bus 180 to the vehicle interface display 142. The vehicle interface display 142 may display any one or more of, but not limited to, a screen shot of I/O, a wiring schematic, fuse box layout, etc. These features will be discussed in more detail below.

Assuming, the vehicle interface display 142 is designated as the primary diagnostic controller, the memory 202 may include a look up table (LUT) 203 that includes any and all DTCs that may be transmitted by the controllers 162, 164, 166, 170, and 172 in the vehicle 100. The LUT 203 may cross reference the received DTC with a corresponding I/O for the particular system 118, 120, 122, 168, 174, and a corresponding wiring schematic for the particular system 118, 120, 122, 168, and 174. In this regard, once the vehicle interface display 142 receives a particular DTC for a particular controller 162, 164, 166, 170, and 172 in the vehicle 100, the microprocessor 200 accesses the LUT 203 to locate the corresponding I/O screen and the corresponding wiring schematic that corresponds to the received DTC. The user can access the corresponding I/O screen and the corresponding wiring schematic via the user interface 152 or switch 153 to view such screens. In this case, the corresponding I/O screen and/or the corresponding wiring schematic provide information corresponding to the detected fault to enable the technician the ability to quickly diagnose and resolve the fault.

The external connectivity circuitry 204 generally includes any number of transceivers 205 to enable the vehicle interface display 142 to transmit the diagnostic information to any number of mobile devices 210, a server 212, or alternatively via hardwire to a computer or diagnostic tool. The mobile device 210 may include a cellular phone, tablet, laptop, etc. The external connectivity circuitry 204 may also include hardware (and software) 207 to support connectivity via wide area network (WAN), local area network (LAN), cellular/mobile communication, BLUETOOTH, WIFI, etc. In this case, the vehicle interface display 142 may wirelessly transmit the diagnostic information to the technician who is located away from the vehicle 100 to enable the technician the ability to work on the fault without having to come back inside the vehicle 100 to look at the various diagnostic screens presented on the display 139 of the vehicle interface display 142. The vehicle interface display 142 may also visually depict additional electronic gauges.

Figure 6:
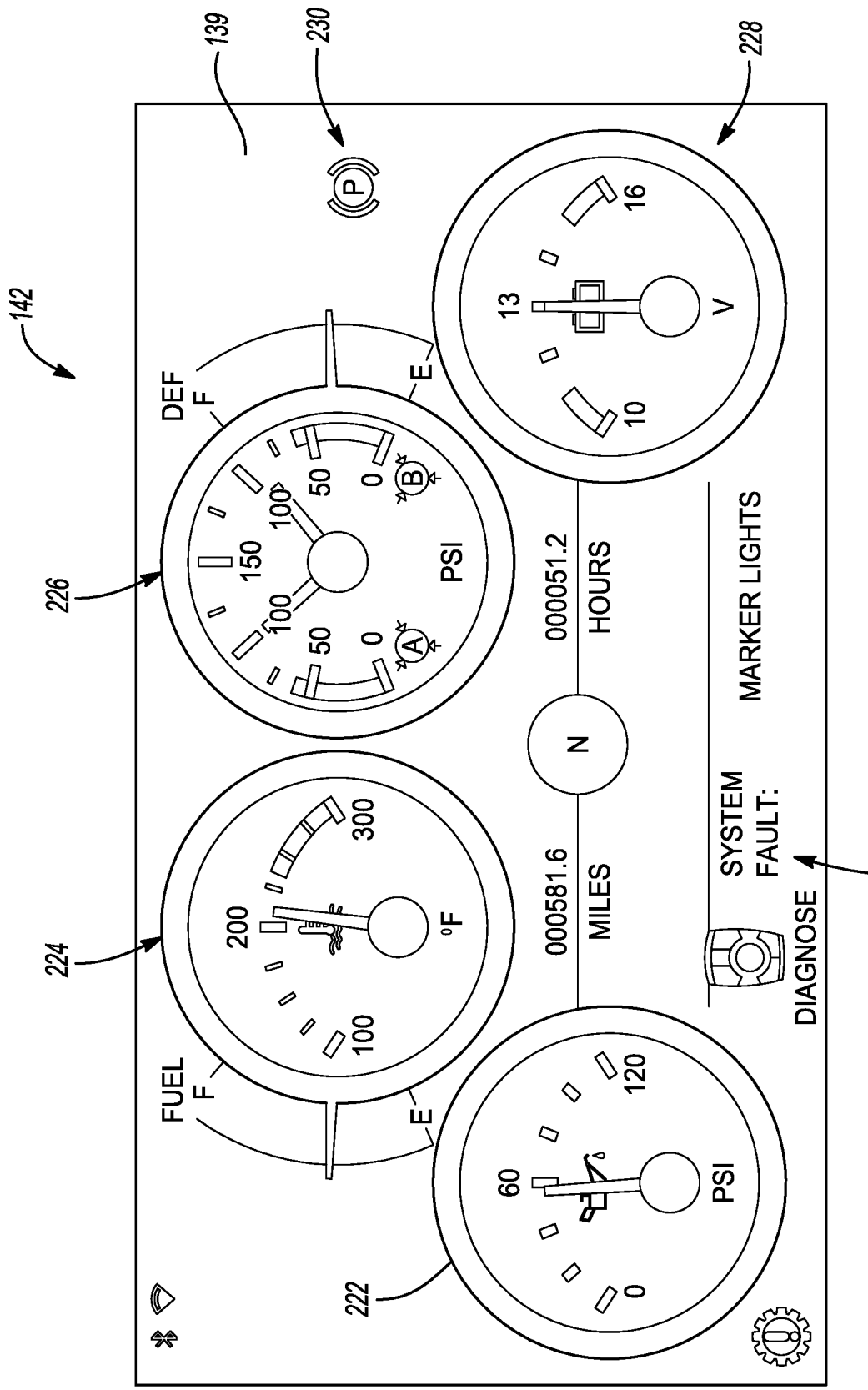
FIG. 6 generally depicts one example of a system fault alert screen as displayed on a vehicle interface display in accordance to one embodiment.
Figure 7:
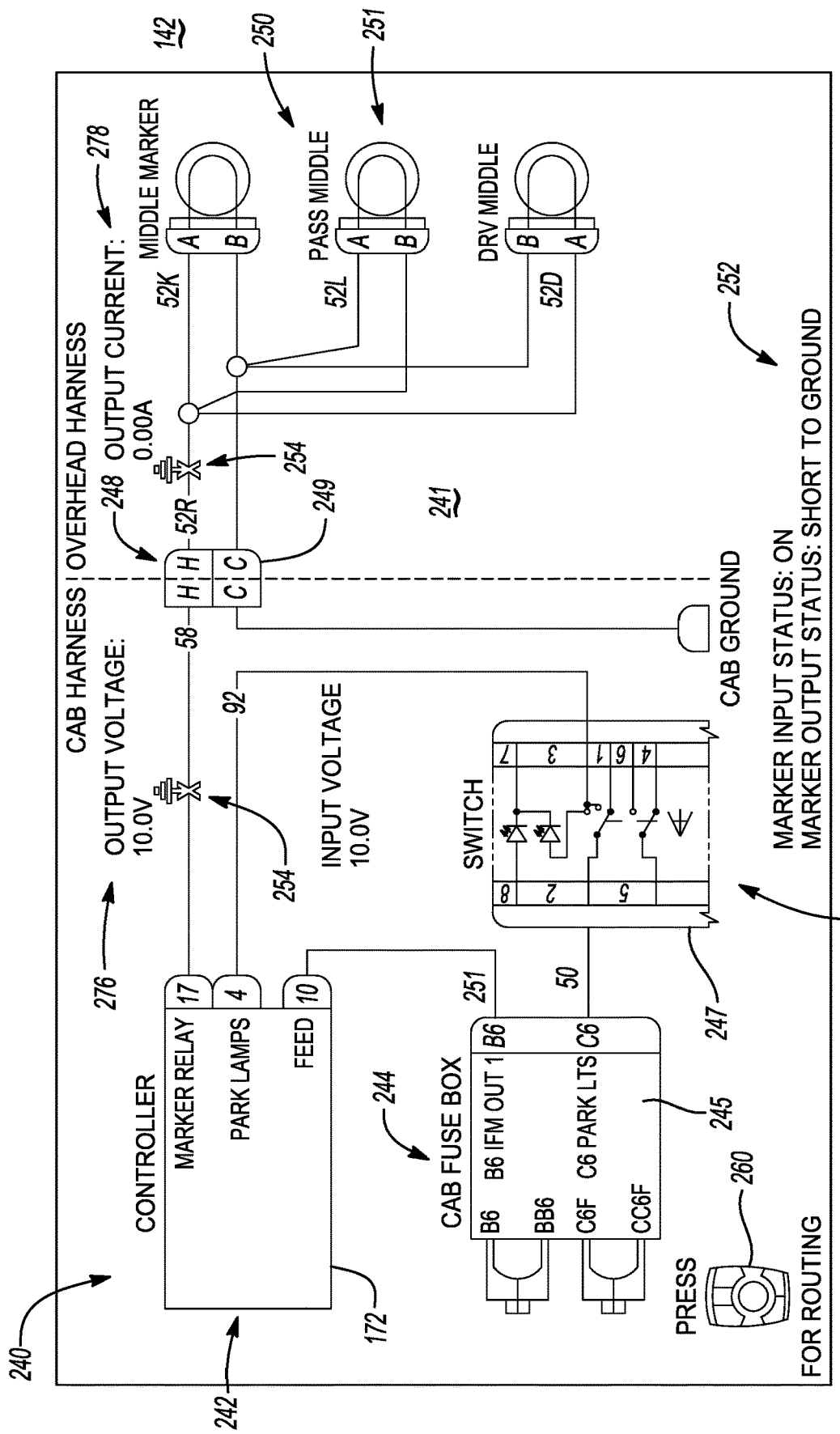
FIG. 7 generally depicts one example of a fault schematic as displayed on the vehicle interface display in accordance to one embodiment.
Figure 8:
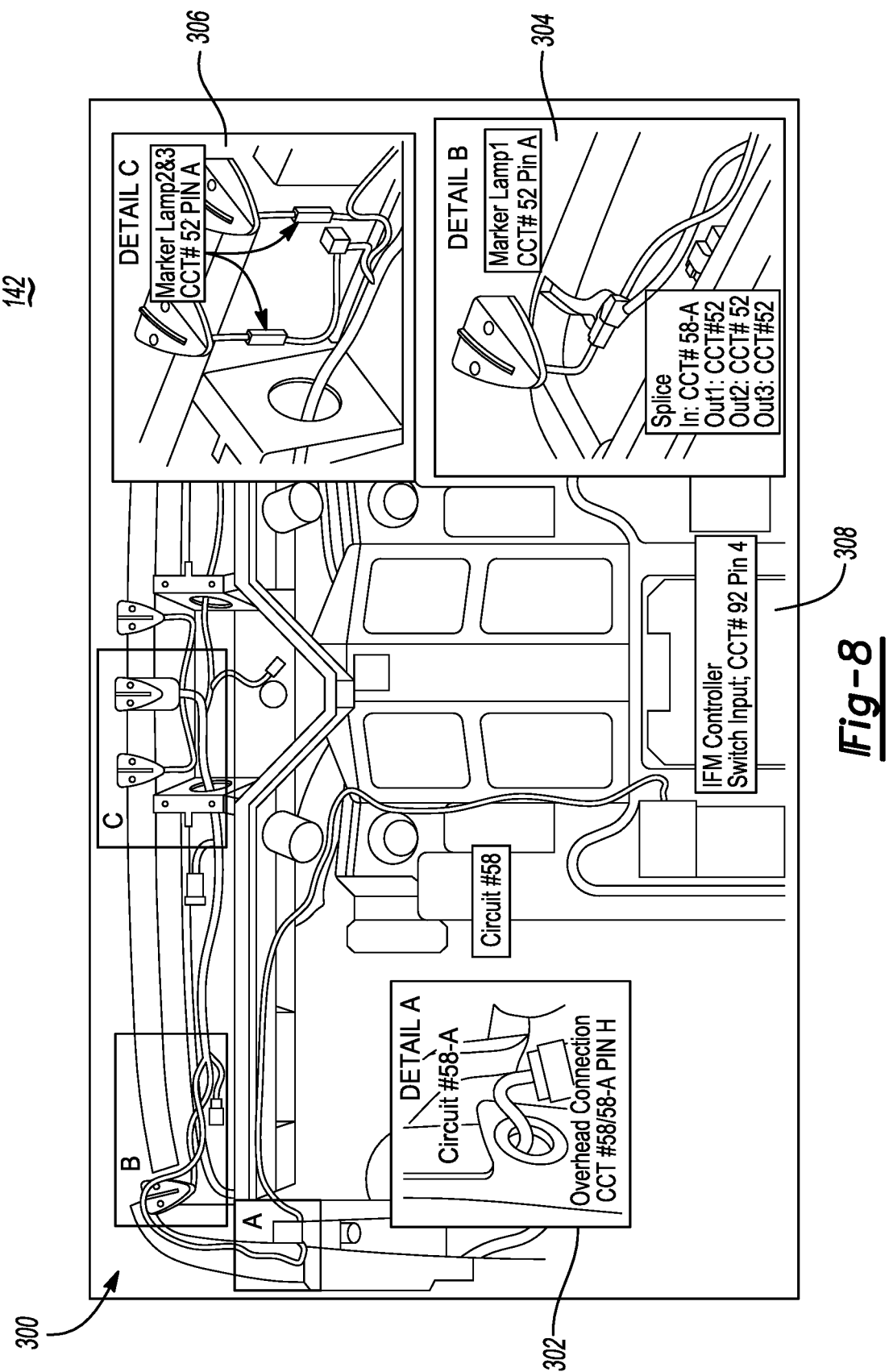
FIG. 8 generally depicts one example of a fault wiring routing screen as displayed on the vehicle interface display in accordance to one embodiment.

FIG. 6 generally depicts one example of a system fault alert screen 220 as displayed on the vehicle interface display 142 in accordance to one embodiment. In this case, the system fault alert screen 220 provides a visual alert that corresponds to a system fault attributed to marker lights of the vehicle 100. Proximate to the system fault, the vehicle interface display 142 provides an icon with a corresponding graphic and text "DIAGNOSE" positioned thereunder. The technician can simply select this icon and the vehicle interface display 142 will provide the screen as illustrated in FIGS. 7-8 (or FIG. 10) if a fault is detected in connection with a fuse box) to allow the technician to quickly obtain information related to the fault. The body controller 172 may detect the fault which may be attributed to a wiring issue/fault or to an issue related to a light bulb of the marker lights. The body controller 172 then transmits a DTC, via the communication bus 180, to the vehicle interface display 142 in response to detecting a fault attributed to the marker lights. The vehicle interface display 142 may then generate the system fault alert screen 220 on the display 139 thereof. The vehicle interface display 142 may also generate oil pressure information 222, fuel temperature information 224, fuel pressure information 226, battery voltage information 228, and park brake status information 230 thereon.

FIG. 7 generally depicts one example of a fault schematic screen 240 as displayed on the vehicle interface display 142 in accordance to one embodiment. The fault schematic screen 240 generally corresponds to a fault schematic for a marker light system 241. The marker light system 241 generally corresponds to a portion of the body control features 174. As shown, the marker light system 241 generally includes at least a portion of the body controller 172, a fuse box 245, a switch 247, at least one connector 249, and various marker lights 251. While FIG. 7 generally depicts electrical interfaces for the marker light system 241, it is recognized that the fault schematic screen 240 may provide a fault schematic for any number of systems 118, 120, 122, 168, 174 in the vehicle 100.

As shown, the fault schematic screen 240 provides a controller field 242, a fuse box field 244, a switch field 246, a wire harness body transition field 248, and various marker light fields 250. The controller field 242 generally provides information for the body controller 172 and all of the various inputs and outputs that are associated with the marker light system 241. For example, the body controller 172 is generally electrically connected to the fuse box 245, the switch 247, the marker lights 251 via the at least one connector 249. Thus, when the body controller 172 executes a diagnostic routine associated with the marker light system 241, the body controller 172 determines electrical parameters for each input/output that is connected to the fuse box 244, the switch 247, the connector 249, and the markers 251. When the body controller 172 may then compare the measure electrical parameters to predetermined electrical parameters to determine whether any of determined electrical parameters do not align with the predetermined electrical parameters. The body controller 172 may generate a corresponding DTC when the electrical parameter is out of range with respect to the predetermined electrical parameters. The body controller 172 may also transmit the DTC to the vehicle interface display 142. The vehicle interface display 142 may then look up the DTC in the LUT 203 and display the corresponding fault schematic screen 240 based on the DTC as received from the body controller 172.

For the fault schematic screen 240 illustrated in FIG. 7, the vehicle interface display 142 displays a SHORT TO GROUND condition in field 252. The vehicle interface display 142 also displays at least two location markers 254 corresponding to where the fault may have occurred in the marker light system 241 to assist the technician in identifying which circuit and/or wire to test and/or replace in the event the failure is attributed to the wiring as opposed to the actual marker light 251.

In general, each controller 162, 164, 166, 170, and 172 may include one or more microprocessors that sense voltage and/or current on a given input and output. When a corresponding controller 162, 164, 166, 170, and/or 172 executes a diagnostic code, the controller 162, 164, 166, 170, and/or 172 can compare the current or voltage measurement parameter to a predetermined electrical parameter and convey faults via the DTC to the vehicle interface display 142 in the event the measured current and/or voltage parameter is out of range with respect to the predetermined electrical parameters. For the example, the fault schematic screen 240 depicts (via the location marker 254) that the fault has either occurred in the wiring that is located in the cab (see "CAB HARNESS" or in the wiring that is located in an overheard wire harness (see "OVERHEAD HARNESS"). In this case, it is possible that the wiring may have been pierced and shorted to ground by virtue of the wiring coming into contact with sheet metal in the vehicle 100. As shown, the fault schematic screen 240 also depicts the corresponding circuit name or number (i.e., circuit designation) for the wiring that may be exhibiting the fault (e.g., circuit number 52 on the CAB HARNESS side) and/or circuit number (or circuit name) 52R on the OVERHEAD HARNESS side). The vehicle interface display 142 also provides a wiring routing screen selection field 260 to enable the driver/technician the ability to display a fault wiring routing screen 300 (see FIG. 8) which depicts the actual wire routing of the electrical wire harness in the vehicle 100 and the possible circuit names and/or locations that may be exhibiting a failure mode which triggers the generation of the DTC(s). The driver/technician may select the wiring routing screen selection field 260 for the vehicle interface display 142 to display the fault wiring routing screen 300.

In addition, any of the corresponding controllers 162, 164, 166, 170, and/or 172, may upon executing the diagnostic routine, may provide a current or voltage measurement parameter to the vehicle interface display 142. In this case, the vehicle interface display 142 is configured to provide measured output voltage and/or a measured output current for the circuit that is detected to be exhibiting a fault. This is illustrated in the fault schematic screen 240 at fields 276 and 278, respectively. In this case, any of the controllers 162, 164, 166, 170, and/or 172 may include a voltage sensor and/or current sensor to measure the voltage and/or current on the input/output, in real time, that is detected to exhibit failure. The controllers 162, 164, 166, 170, and/or 172 may then transmit the voltage and/or current measurements over the data communication bus 180 to the vehicle interface display 142. In turn, the vehicle interface display 142 may then display the measured voltage and/or current on the display 139 thereof at the fields 276 and 278 in real time. It is recognized that there may be a minor delay in providing the current or voltage readings at the fields 276 and 278 due to the latencies on the data communication bus 180 and processing of the data. However, such live measurements may be displayed continuously at the vehicle interface display 142 and change as the current and/or voltage values exhibit a change accordingly.

FIG. 8 generally depicts one example of the fault wiring routing screen 300 as displayed on the vehicle interface display 142 in accordance to one embodiment. The fault wiring routing screen 300 is generally illustrated in FIG. 8 to coincide with the marker light system 241 as illustrated in connection with the fault schematic screen 240 of FIG. 7. It is recognized that the vehicle interface display 142 may generate the fault wiring routing screen 300 for any of the systems 118, 120, 122, 168, and 174.

The fault wiring routing screen 300 provides a pictorial of the actual routing of the wires in the vehicle 100 that is identified in the fault schematic screen 240 as possible locations of where a fault may have occurred. For example, the fault wiring routing screen 300 provides a plain view of wire harnesses in the vehicle 100 that include the circuit name identified in the location marker 254 as depicted in the fault schematic screen 240. As noted in FIG. 7, the fault schematic screen 240 identified circuit names 52 (or 52R) and 58 as possible wires that may have been damaged to cause the detected fault. The fault wiring routing screen 300 provides various detailed views 302, 304, and 306 which provide a close up view of the corresponding circuit name and connector to further aid the technician/driver in resolving the failure mode. For example, detail 302 illustrates a blown-up view of mating connectors in the overhead harness connection that includes circuit 58 in the overhead connection of the wire harness. Detail 302 also includes the corresponding pin number or pin designation for a particular connector that houses the circuit affected circuit number. As shown, detail 302 illustrates that the circuit name, 58 or 58-A may be positioned in pin number "H" of the connector assembly shown therein.

Detail 304 illustrates a blown-up view of the mating connectors for a first marker lamp that includes circuit numbers 52 and the corresponding pin number "A" for the connector assembly (e.g., pin A houses the circuit number 52). Detail 304 illustrates a corresponding wiring splice that is located in close proximity of the connector assembly that is also shown in detail 304. Detail 304 illustrates that the splice includes three circuits that correspond to circuit name 52 and another circuit that corresponds to circuit name 58. Detail 306 illustrates a blown-up view of the mating connectors for a second marker lamp that includes circuit number 52 and the corresponding pin number "A" (e.g., pin A houses the circuit number 52). Detail 308 as also shown in FIG. 8 which provides relevant information (e.g., pinout information) for the body controller 172. In this case, pin 4 of the body controller 172 is identified and a circuit number of 92 is illustrated that is coupled to the overhead connection as illustrated in Detail 302.

Figure 9:
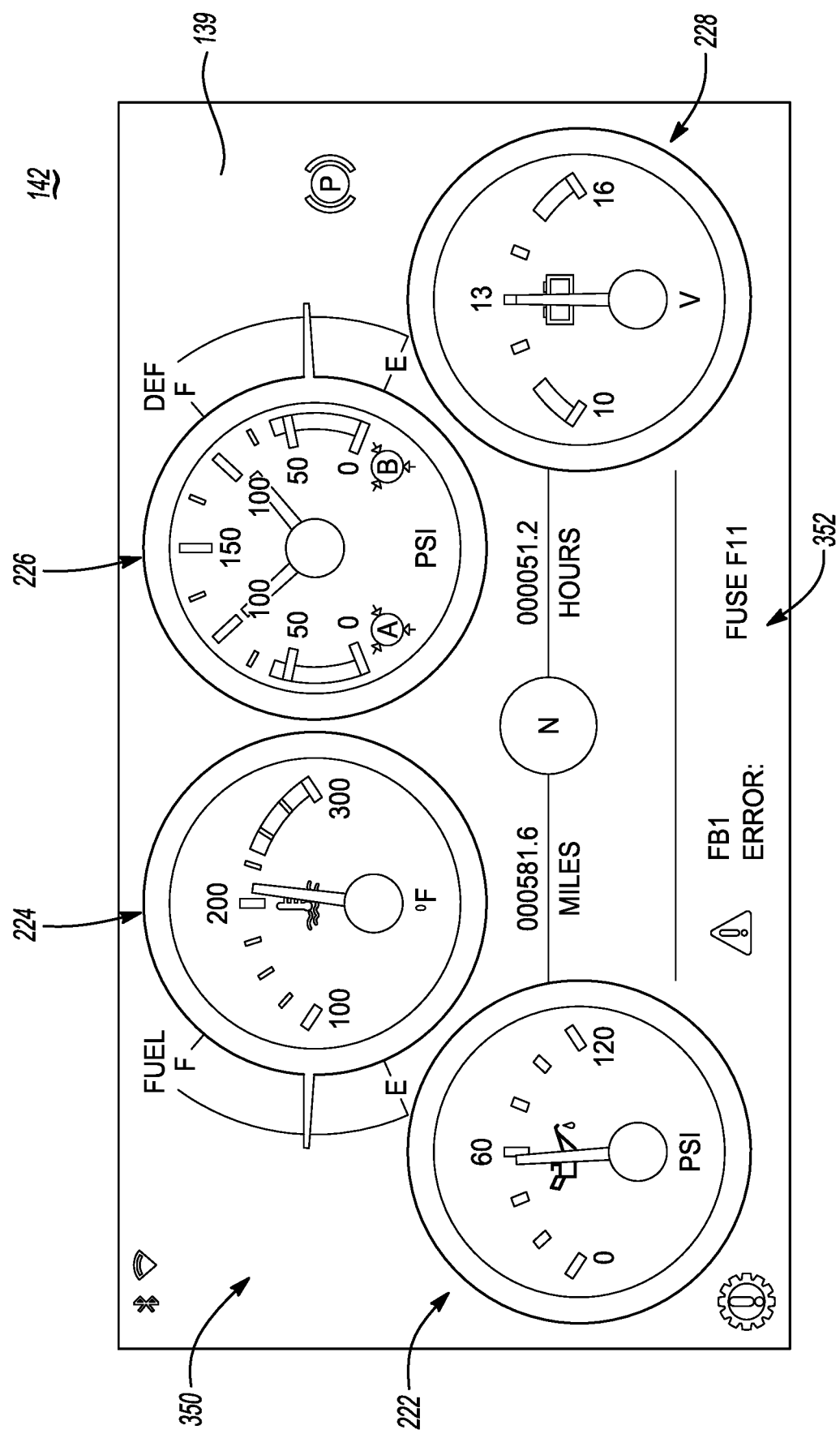
FIG. 9 generally depicts one example of fuse alert screen as displayed on the vehicle interface display in accordance to one embodiment.

FIG. 9 generally depicts one example of fuse alert screen 350 as displayed on the vehicle interface display 142 in accordance to one embodiment. The vehicle interface display 142 continues to display the relevant information 222, 224, 226, and 228 as discussed in connection with FIG. 6.

The fuse alert screen 350 provides fuse fault information 352 that indicates a fault with a particular fuse for the vehicle 100. The fuse fault information 352 indicates the actual fuse (e.g., "FUSE F11") that is exhibiting the failure. The vehicle interface display 142 is electrically coupled to the fuse box 151 and monitors the corresponding inputs/outputs of the fuse box 151 to assess the electrical integrity of each corresponding fuse. The vehicle interface display 142 generates the fuse alert screen 350 in response to detecting a fault associated with any particular fuse of the fuse box 151 (e.g., missing or blow fuse, etc.)

Figure 10:
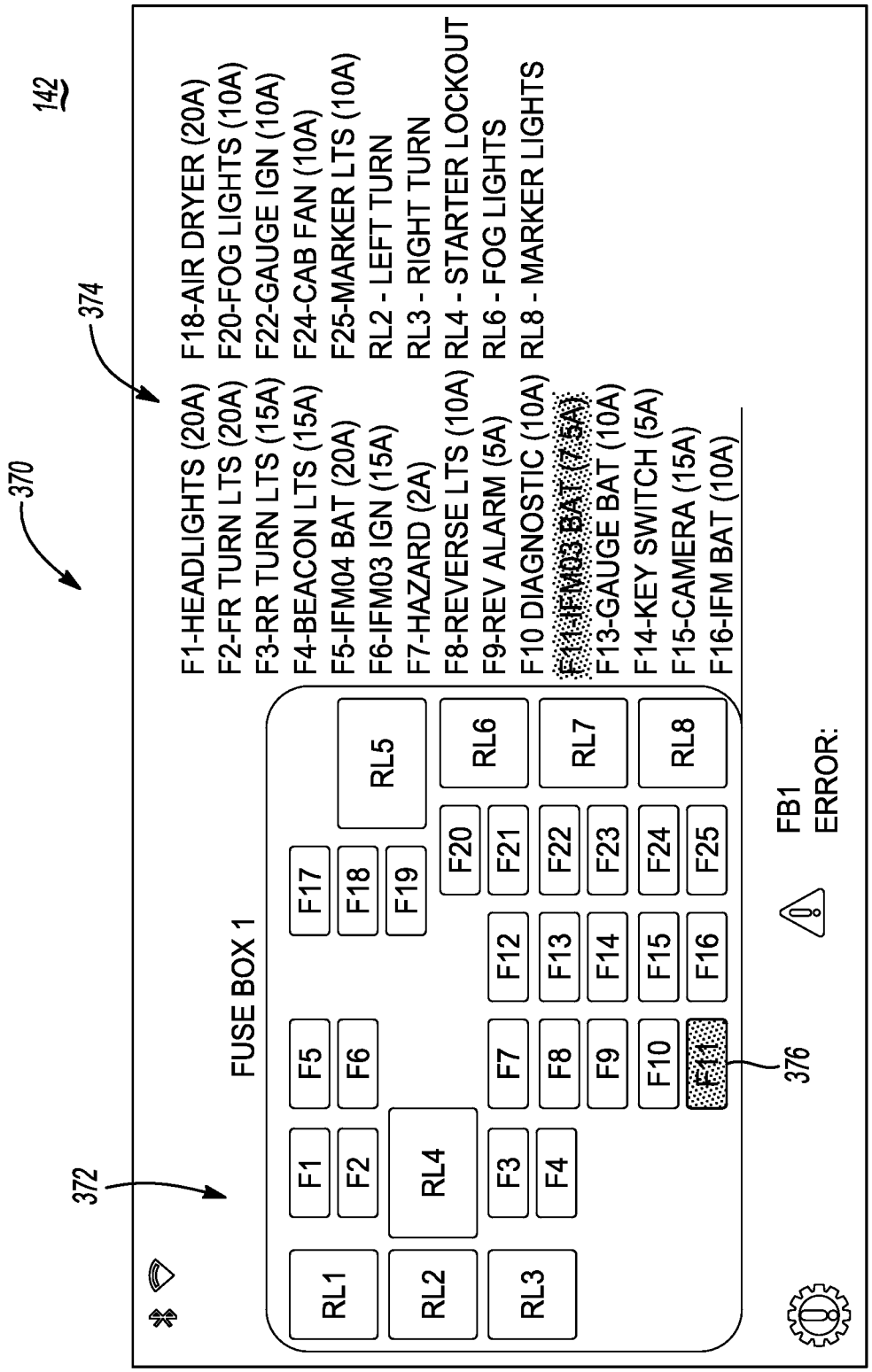
FIG. 10 generally depicts one example of a fuse fault detail screen as displayed on the vehicle interface display in accordance to one embodiment.

FIG. 10 generally depicts one example of a fuse fault detail screen 370 as displayed on the vehicle interface display 142 in accordance to one embodiment. The vehicle interface display 142 also generates the fuse fault detail screen 370 in response to detecting a fault associated with any particular fuse of the fuse box 151. The vehicle interface display 142 may first generate and display the fuse alert screen 350 for the technician. The user may then select a field (not shown) in the fuse alert screen 350 such that the vehicle interface display 142 then depicts the fuse fault detail screen 370 to provide more detail with respect to the detected fault of the fuse box 151. The fuse fault detail screen 370 provides a fuse box graphic field 372 and a fuse legend field 374. The fuse box graphic field 372 generally provides a pictorial layout of fuses in a fuse box of the vehicle 100. The fuse box graphic field 372 highlights the fuse that is detected to have a corresponding fault (see element 376 in FIG. 10) so that this information is readily and easily ascertainable for the driver/technician. The fuse legend field 374 provides a text-based listing of the corresponding fuse numbers. For example, the fuse legend field 374 provides a fuse designation (e.g., F1-F25 and RL2-RL8), the vehicle feature protected by the fuse, and the current rating for the fuse. In one example, the body controller 172 (or other suitable controller) may include a voltage or current measurement device to measure the corresponding voltage or current at each input of the fuse box for any or all of the fuses in the fuse block.

Figure 11:
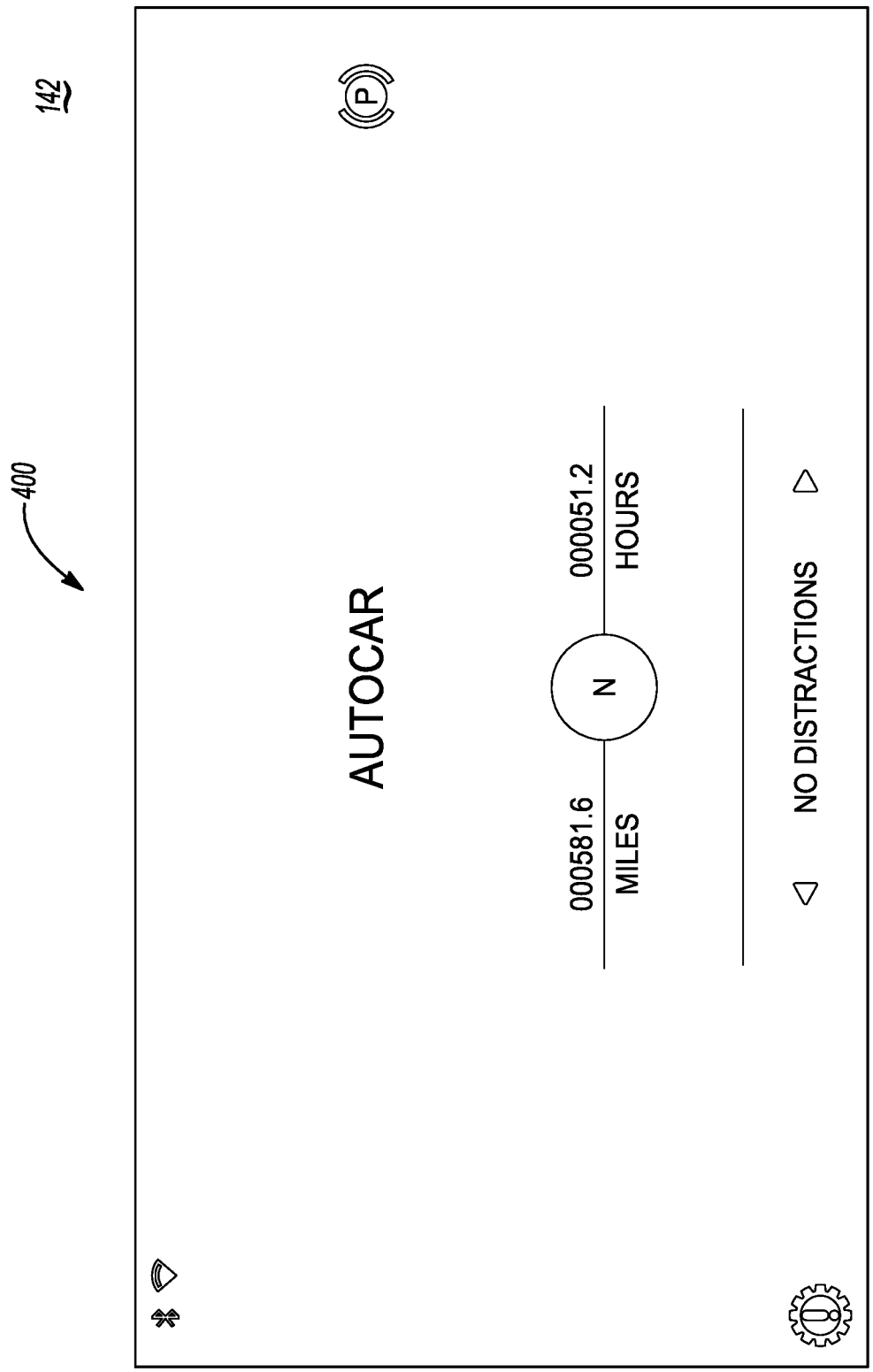
FIG. 11 generally depicts one example of a "no distraction" screen as displayed on the vehicle interface display in accordance to one embodiment.

FIG. 11 generally depicts one example of a "no distraction" screen 400 as displayed on the vehicle interface display 142 in accordance to one embodiment. The vehicle interface display 142 provides the no distraction screen 400 in an effort to minimize driver distraction. For example, the vehicle interface display 142 may only depict essential information that is necessary for the driver to know such as the total number of miles driven and the duration in hours (or other time based metric) the engine 118 has been running. This information is generally provided to the driver for maintenance purposes. As noted above, the vehicle 100 may be a class 7 or 8 truck that is used as a refuse truck or may include a crane carrying body, a traffic paint striping body, a street sweeper body, a concrete pumping body, or the like. In some instances, the vehicles may idle for long periods of time and the duration at which the engine 118 runs needs to be conveyed to the driver to let the driver know how long the engine 118 is running for maintenance purposes.

The vehicle interface display 142 is configured to display the no distraction screen any time the vehicle 100 is in drive, or alternatively, when vehicle speed is greater than a predetermined vehicle speed. The vehicle interface display 142 may continue to display the no distraction screen even in the event various faults are detected (e.g., DTCs are generated by any one of the controllers 162, 164, 166, 170, and 172) in the vehicle 100. In this case, the vehicle interface display 142 may not display any of the system fault alert screen 220, the fault schematic screen 240, the fault wiring routing screen 300, the fuse alert screen 350, and the fuse fault detail screen 350 until the vehicle 100 is detected to be in a PARK state or vehicle speed is detected to be less than the predetermined vehicle speed. The vehicle interface display 142 may receive data from the brake controller 166, via the data communication bus 180, to determine whether the park brake is engaged. Alternatively, the vehicle interface display 142 may receive vehicle speed, via the data communication bus 180 to determine whether the speed of the vehicle 100 is either above, or below the predetermined vehicle speed.

As noted above, the vehicle interface display 142 may transmit any one or more of the system fault alert screen 220, the fault schematic screen 240, the fault wiring routing screen 300, the fuse alert screen 350, and the fuse fault detail screen 350 via the external connectivity circuitry 204 to the mobile device 210 and/or the server 212 in response to receiving any DTCs from any one or more of the various controllers 162, 164, 166, 170, and 172) in the vehicle 100. The vehicle interface display 142 may be configured to wirelessly transmit any one or more of the system fault alert screen 220, the fault schematic screen 240, the fault wiring routing screen 300, the fuse alert screen 350, and the fuse fault detail screen 370 to the mobile device 210 only after the vehicle 100 is detected to be in the PARK mode, or when the vehicle speed is detected to be less than the predetermined vehicle speed. In this case, the vehicle interface display 142 may prevent such wireless transmission to the mobile device 210 while the vehicle is being driven to prevent the driver from accessing the mobile device 210 to view the various screens 220, 240, 300, 350, 370 to minimize driver distraction. A driver (or administrative driver) such as a fleet owner may configure to vehicle interface display 142 to selectively wirelessly transmit the various screens 220, 240, 300, 350, and 370 to the mobile device 210 (i.e., to a mobile device that does not belong to the actual driver who may be an employee of the administrative driver) and/or the server 212 so that such information can be accessed at any time.

Figure 12:
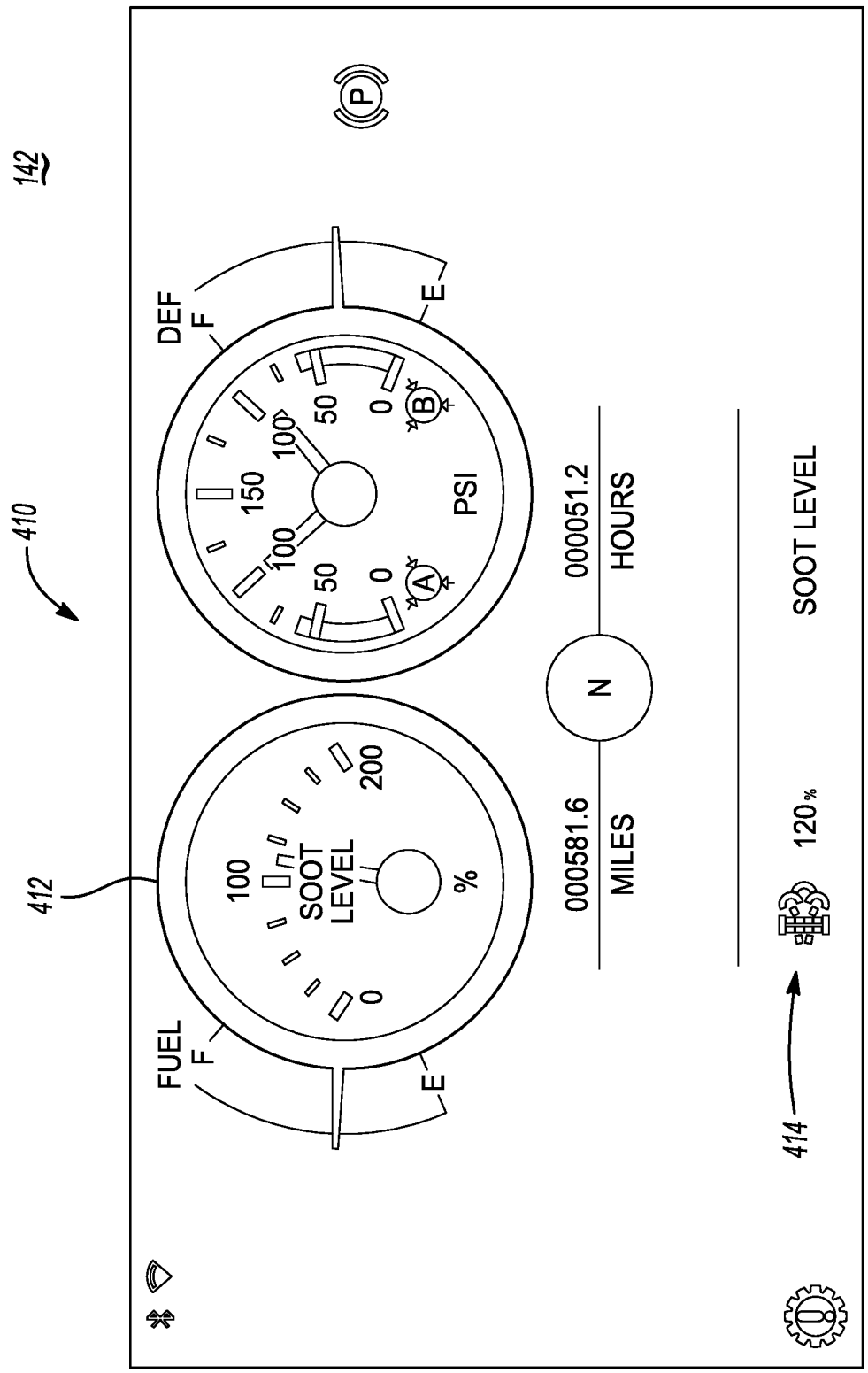
FIG. 12 generally depicts one example of a gauge alert screen as displayed on the vehicle interface display in accordance to one embodiment.

FIG. 12 generally depicts one example of a gauge alert screen 410 as displayed on the vehicle interface display 142 in accordance to one embodiment. The gauge alert screen 410 generally provides information to the driver with respect to a soot level from an exhaust of the vehicle 100. For example, diesel-based trucks generally include a diesel particulate filter (DPF) (not shown) that captures soot from the vehicle's exhaust before the soot is blown out to the environment. The vehicle interface display 142 is configured to receive a signal indicative of a soot level from the DPF. It is recognized that the DPF filter may be directly coupled to the vehicle interface display 142 and the vehicle interface display 142 may process the signal from the DPF to ascertain the soot level of the DPF. In another example, the DPF may provide a signal indicative of the soot level to another controller positioned in the vehicle. Such a controller may than process the signal to ascertain the soot level and transmit a message over the data communication bus 180 to the vehicle interface display 142. In this case, the vehicle interface display 142 provides status of the soot level on the gauge alert screen 410 in response to receiving the message over the data communication bus 180.

As the exhaust passes through the DPF, that is somewhere between 85-100% of particulate matter from a diesel engine that is collected by the DPF. However, over time, soot builds up in walls of the filter and must be removed from the filter to burn out the soot in the filter. To provide status as to the soot build up in the vehicle 100, the gauge alert screen 410 includes a soot level gauge 412 that provides a percentage of soot level build up in the DPF of the vehicle 100. In addition, the gauge alert screen 410 also provides a soot level field 414 to visually provide the percentage of the soot level build up in the vehicle 100. In this case, the soot level gauge 412 and the soot level field 414 depicts a soot level percentage of 120% which falls within an acceptable range.

Figure 13:
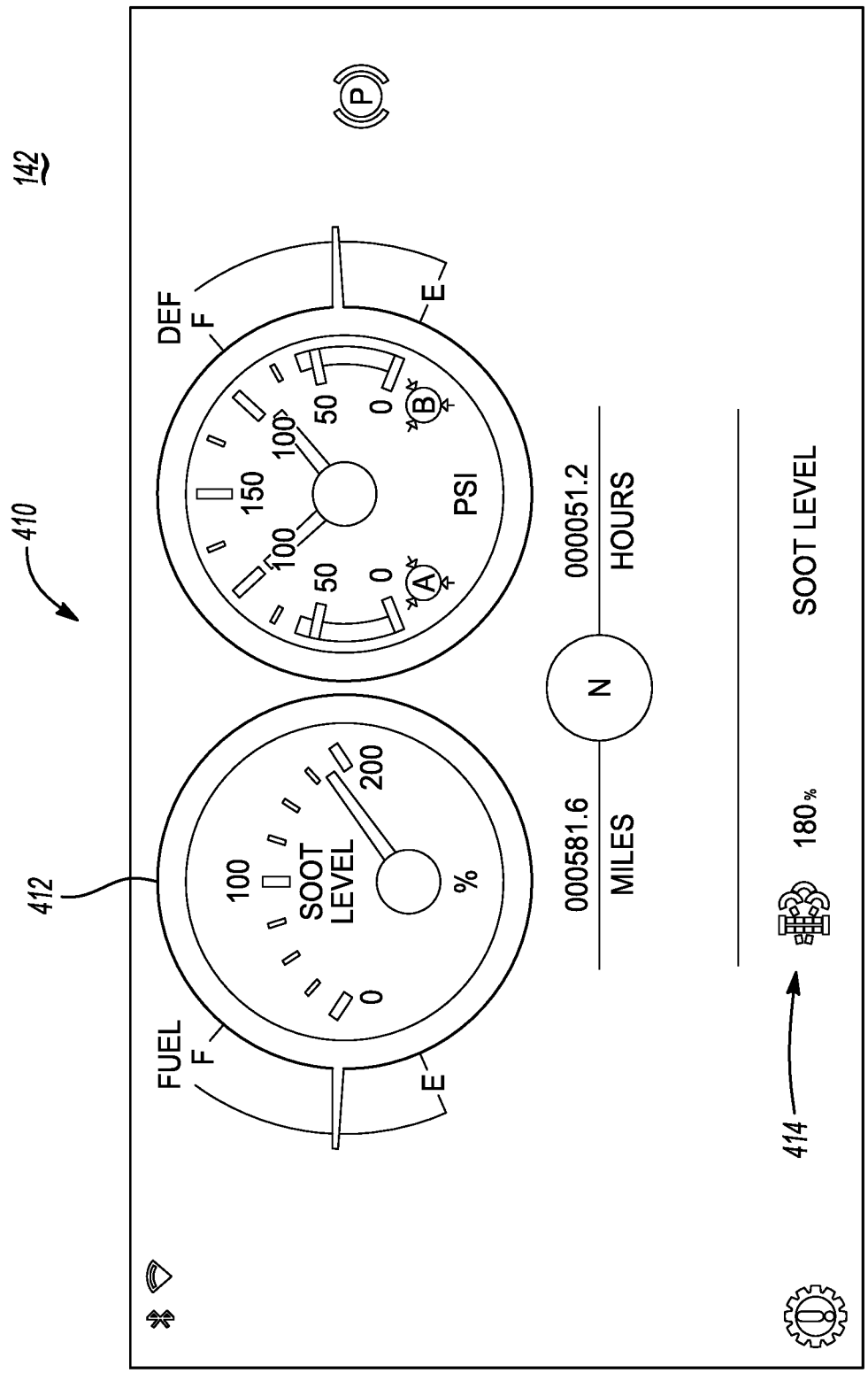
FIG. 13 generally depicts another example of the gauge alert screen as displayed on the vehicle interface display in accordance to one embodiment.

FIG. 13 generally depicts one example of the gauge alert screen 410 as displayed on the vehicle interface display 142 in accordance to one embodiment. As shown, the soot level gauge 412 and the soot level field 414 depicts a soot level percentage of 180%. In this case, the soot level percentage of 180% is indicative of a high level of soot that is present in the DPF. While not illustrated in FIG. 13, the soot level gauge 412 is configured to also turn RED to notify the driver of the high soot level percentage. This aspect indicates that the vehicle 100 must be taken in for service immediately to have the soot removed from the DFE. The vehicle interface display 142 is generally configured to provide the gauge alert screen 410 including the soot level gauge 412 and the soot level field 414 irrespective of whether the soot level percentage is normal or high and irrespective of the state of vehicle speed and/or park brake status. In the event the vehicle interface display 142 detects that a normal or acceptable value for the soot level and the vehicle interface display 142 provides the no distraction screen 400, the vehicle interface display 142 may continue to provide the no distraction screen 400. In the event the vehicle interface display 142 detects a high soot level that is outside of the accepted parameter, then the vehicle interface display exits from the no distraction screen 400 and provides the gauge alert screen 410 that depicts the corresponding soot level percentage and also illuminates the soot level gauge 412 to alert the driver of the detected high soot level.

Figure 14:
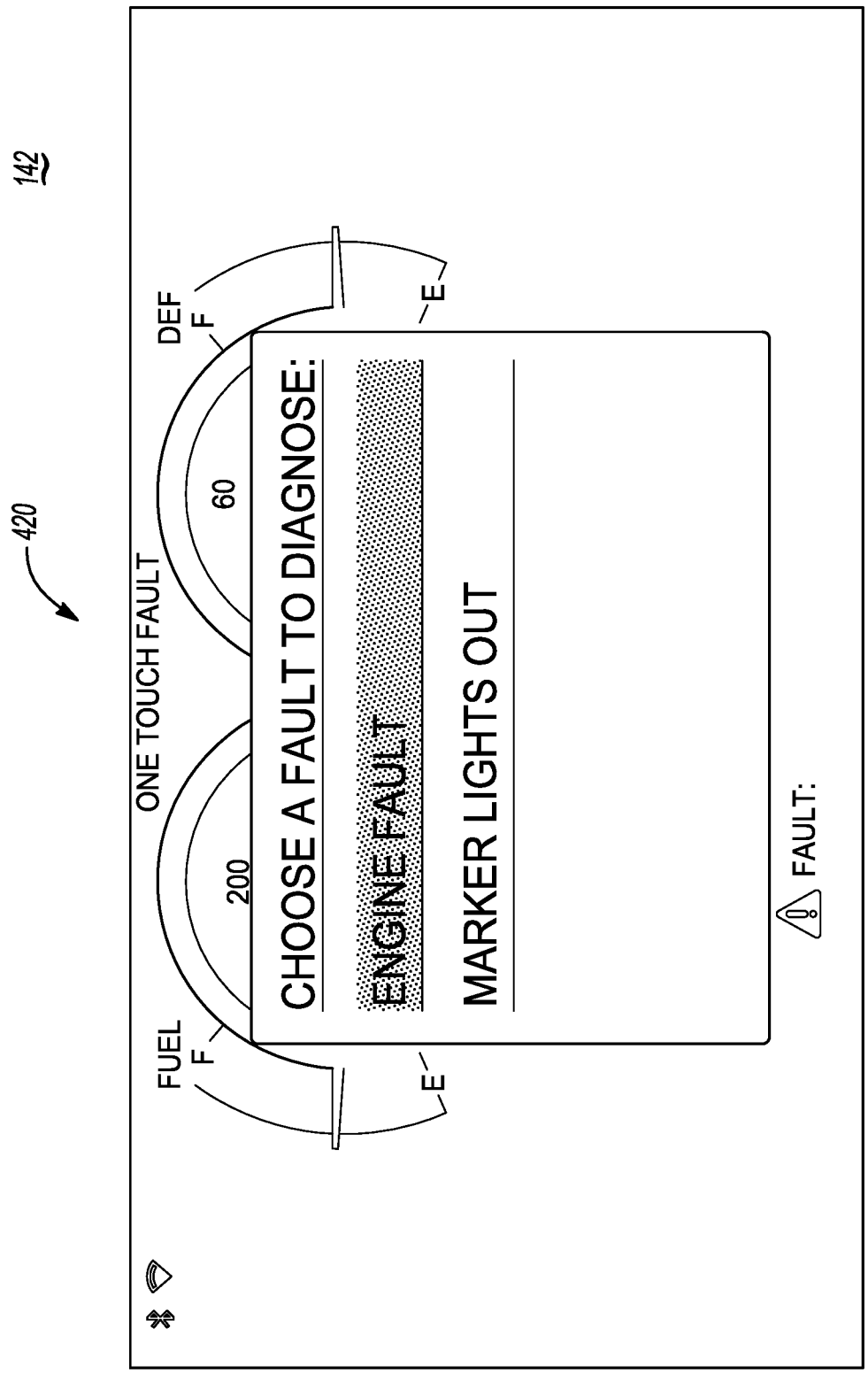
FIG. 14 generally depicts one example of a fault selection screen as displayed on the vehicle interface display in accordance to one embodiment.

FIG. 14 generally depicts one example of a fault selection screen 420 as displayed on the vehicle interface display 142 in accordance to one embodiment. The vehicle interface display 142 provides the fault selection screen 420 to the driver in response to the multiple faults being detected. For example, the vehicle interface display 142 detects a fault related to the engine 118 and a fault related to the lighting system (e.g., side marker lights out). In this case, the driver may select the corresponding fault of interest in order to view detail surrounding the fault of interest.

Figure 15:
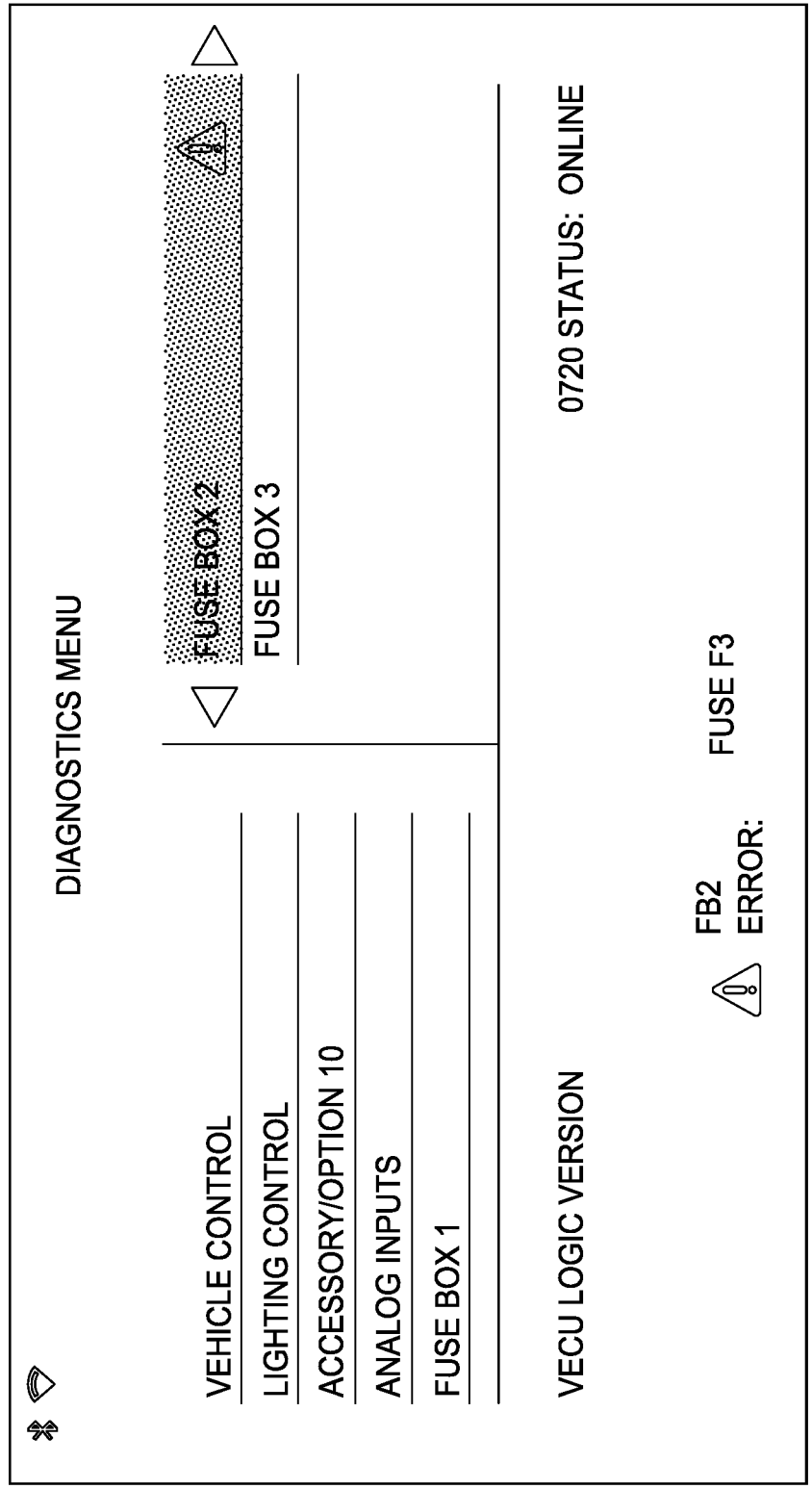
FIG. 15 generally depicts one example of a diagnostic menu screen as displayed on the vehicle interface display in accordance to one embodiment.

FIG. 15 generally depicts one example of a diagnostic menu screen 422 as displayed on the vehicle interface display 142 in accordance to one embodiment. The diagnostic menu screen 422 enables the driver or technician the ability to select a particular electrical subsystem that is exhibiting a fault. For example, the driver or technician may select to view faults that are present in relation to vehicle control (e.g., starting system, lighting accessories, or any inputs and outputs that a system monitors), engine, transmission, ABS, and/or any number of the fuse boxes that are present in the vehicle 100. In the example shown, the driver/technician may select to view fault(s) that are present in connection with fuse box 2. In general, the vehicle 100 may be constantly monitoring all systems thereof and a self-test may not be necessary. In the event the user toggles the vehicle interface display 142 to turn to the diagnostic menu screen 422, the diagnostic menu screen 422 highlights a particular area or system that is detected to exhibit a fault and provides an icon to also indicate the fault for the particular area or system that is detected to exhibit the fault. For example, in the example illustrated in FIG. 15, "FUSE BOX 2" is highlighted and an error icon is positioned to the right of the "FUSE BOX 2" is displayed to notify the user of a detected fault.

Figure 16:
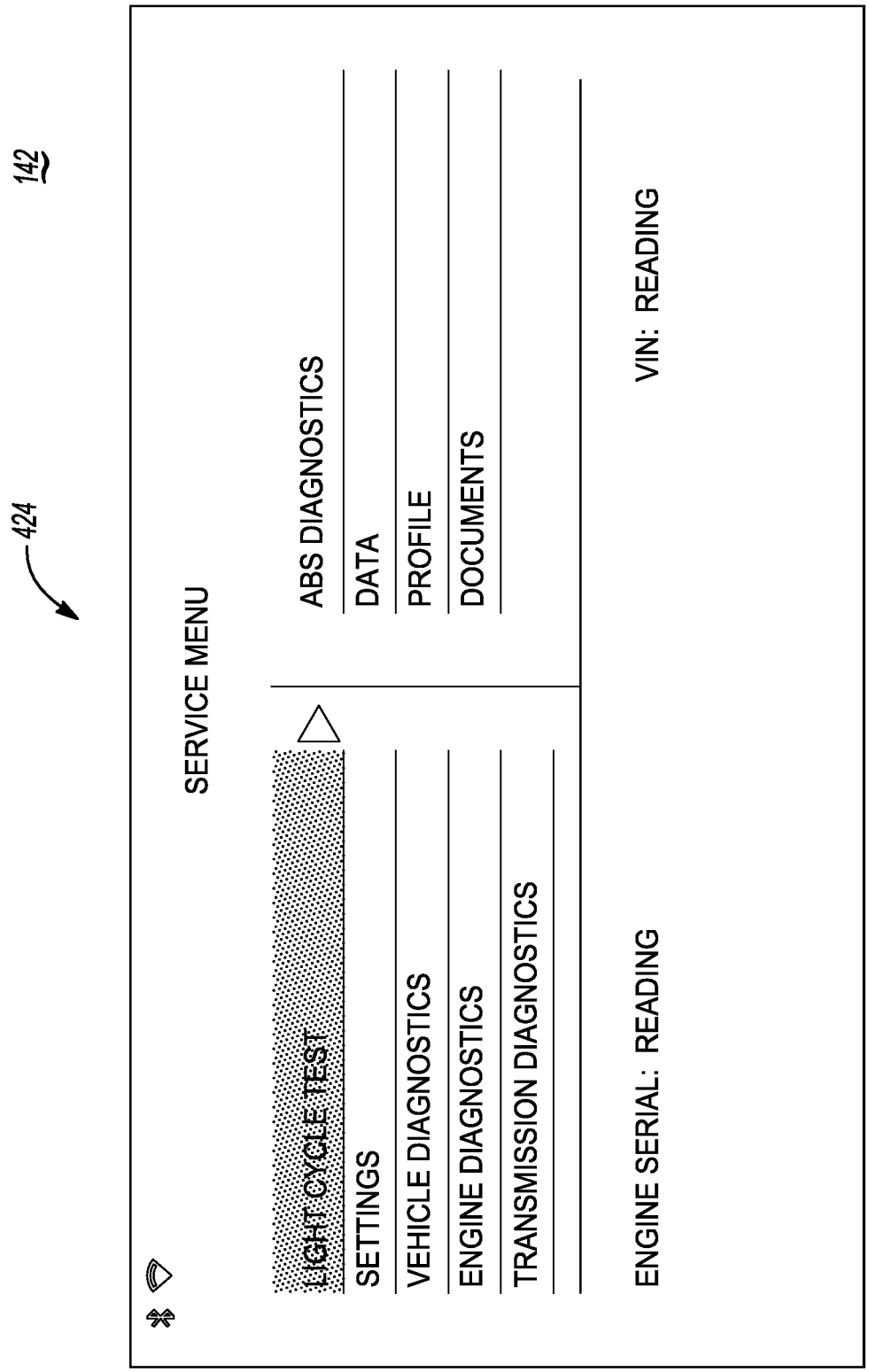
FIG. 16 generally depicts one example of a service menu selection screen as displayed on the vehicle interface display in accordance to one embodiment.

FIG. 16 generally depicts one example of a service menu selection screen 424 as displayed on the vehicle interface display 142 in accordance to one embodiment. The service menu selection screen 424 generally corresponds to a primary menu screen. From the service menu selection screen 424, the technician may diagnose each of the illustrated control systems on the screen 424 in FIG. 16.

Figure 17:
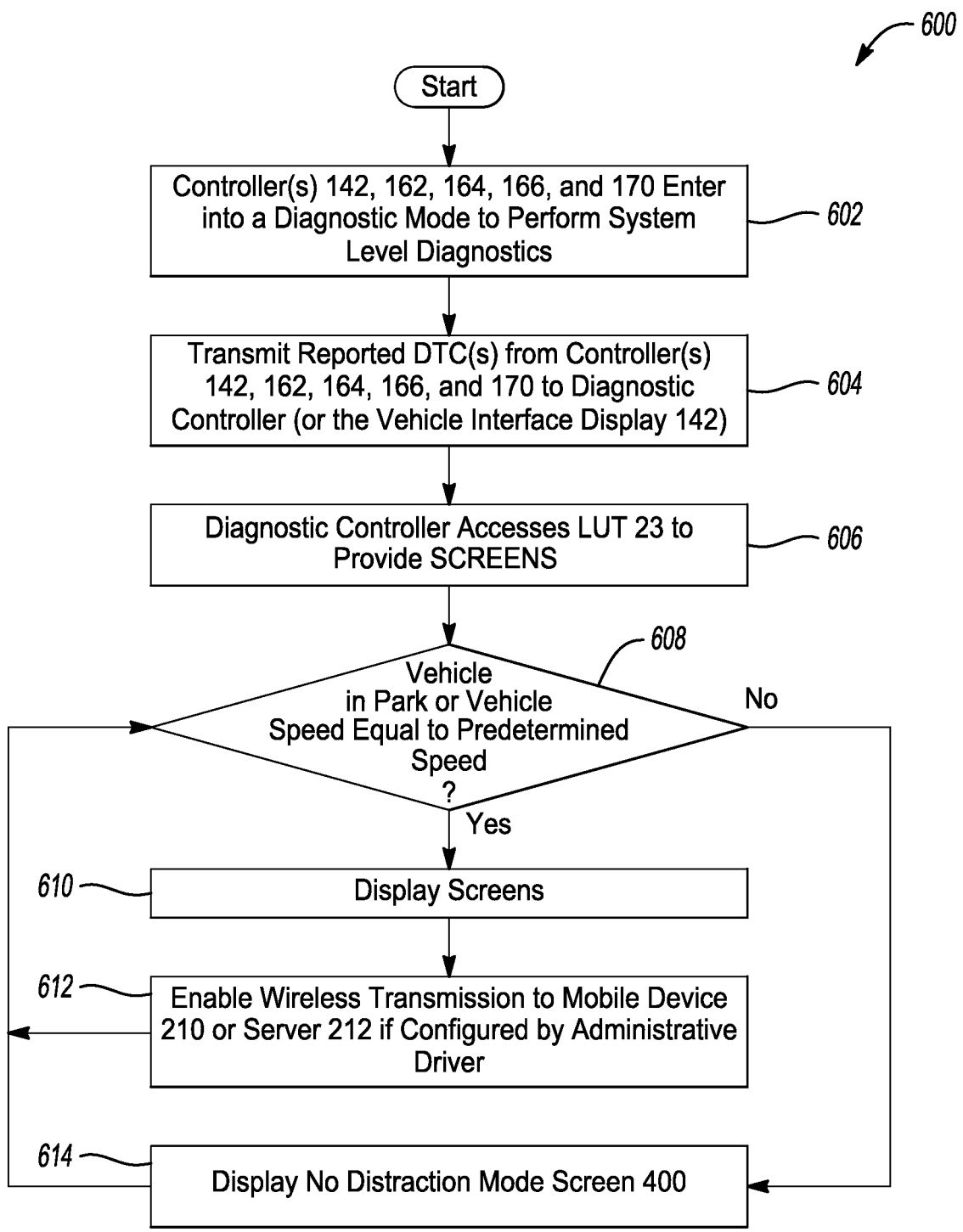
FIG. 17 depicts a method for generating and displaying various diagnostic screens in accordance to one embodiment.

FIG. 17 depicts a method 600 for generating and displaying various diagnostic screens (e.g., screens 220, 240, 300, 350, 370, 420, 422, and 424) in accordance to one embodiment. The method 600 references a primary diagnostic controller. As noted above, the primary diagnostic controller may correspond to the vehicle interface display 142, the engine controller 162, the transmission controller 164, the brake controller 166, the fuel controller 170, or the body controller 172.

In operation 602, any one or more of the controllers 142, 162, 164, 166, 170, and 172 enter into a diagnostic mode to perform system level diagnostics on the corresponding system that such controllers 142, 162, 164, 166, 170, and 172 control and/or monitor.

In operation 604, any one or more of the controllers 142, 162, 164, 166, 170, and 172 transmit, via the data communication bus 180, any DTCs that are set to the primary diagnostic controller. For the method 600, it will be assumed, for example, that the vehicle interface display 142 may correspond to the primary diagnostic controller and that the vehicle interface display 142 receives any DTC from any one or more of the controllers 162, 164, 166, 170, 172, etc. As noted above, the DTC generally corresponds to a detected fault. Once any of the controllers 142, 162, 164, 166, 170, and 172 detect a fault, a corresponding DTC is set to identify the fault to the driver or technician.

In operation 606, the vehicle interface display 142 accesses the LUT 203 to provide information on the corresponding screens (e.g., screens 220, 240, 300, 350, 370, 420, 422, 424, etc.) that correspond to the received DTC(s).

In operation 608, the vehicle interface display 142 determines whether the vehicle is in PARK or whether vehicle speed equal to a predetermined vehicle speed. In one example, the predetermined vehicle speed may correspond to 0 mph. As noted above, the vehicle interface display 142 may receive data from the brake controller 166, via the data communication bus 180, to determine whether the park brake is engaged. If this condition is met, then the method 600 proceeds to operation 610. If not, then the method 600 proceeds to operation 612.

In operation 610, the vehicle interface display 142 displays screens (e.g., screens 220, 240, 300, 350, 370, 420, 422, and 424) to enable a service manager (or driver, technician, etc.) to view information related to the fault and to allow the service manager or technician the ability to fix the fault.

In operation 612, the vehicle interface display 142 may also wirelessly transmit information corresponding to the screens (e.g., screens 220, 240, 300, 350, 370, 420, 422, 424, etc.) to the mobile device 210 or the server 212. In this case, the technician or service manager can exit the vehicle 100 and troubleshoot faults detected in the engine compartment or in any area outside of the vehicle 100 by viewing the screens on the mobile device 210 (e.g., tablet, laptop, etc) without having to re-enter the vehicle 100 to view the screens 220, 240, 300, 350, and 370 on the vehicle interface display 142. The vehicle interface display 142 enables wireless transmission, via the external connectivity circuitry 204 of the screens to the mobile device 210 and/or the server 212. The vehicle interface display 142 may execute operation 626 in the event an administrative driver (e.g., fleet vehicle manager) selects this option on the vehicle interface display 142. In one example, the fleet vehicle manager may enter a PIN into the vehicle interface display 142 to identify himself/herself to the vehicle interface display 142 as the administrative driver to select this option via switches on the vehicle interface display 142.

In operation 614, the vehicle interface display 142 displays the no distraction mode screen 614 as set forth in FIG. 11. In this case, the vehicle 100 is detected to be moving and it is generally undesirable to provide the screens to minimize driver distraction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A class 7 or 8 vehicle comprising:
   a data communication bus;
   a first controller configured to:
      control a vehicle operation;
      detect one or more failures related to the vehicle operation; and
      transmit first data indicative of the one or more failures; and
   a vehicle interface controller including memory and being configured to:
      receive the first data indicative of the one or more failures on the data communication bus;
      receive a signal corresponding to at least one of vehicle speed or park brake status;
      access the memory to retrieve at least one diagnostic screen that corresponds to the one or more failures indicated on the first data; and
      display the at least one diagnostic screen after the signal indicates the at least one of the vehicle speed being equal to a predetermined vehicle speed or the park brake status indicating that a park brake is set in the vehicle,
      wherein the vehicle interface controller is further configured to:
         generate and display a no distraction screen that identifies first level information including at least one of a distance driven by the vehicle or a duration of time an engine of the vehicle is running to minimize driver distraction;
         monitor for a soot level of the vehicle while the vehicle interface controller provides the no distraction screen; and
         remove the no distraction screen and display a warning indicative of a high soot level in response to the soot level exceeding a predetermined limit.

2. The vehicle of claim 1, wherein the first data includes at least one diagnostic trouble code (DTC) that is indicative of the one or more failures.

3. The vehicle of claim 2, wherein the vehicle interface controller is further configured to retrieve the at least one diagnostic screen from the memory based on the at least one DTC.

4. The vehicle of claim 3, wherein the at least one diagnostic screen includes one of a system fault alert screen, a fault schematic screen, and a fault wiring routing screen.

5. The vehicle of claim 4, wherein the system fault alert screen corresponds to faults related to an engine system, a fuel system, a brake system, a transmission system, a body control system, and a lighting system of the vehicle.

6. The vehicle of claim 4, wherein the fault schematic screen provides information corresponding to inputs and outputs for electrical devices and connectors used in connection with a vehicle system detected to exhibit a fault.

7. The vehicle of claim 1 wherein the vehicle interface controller is further configured to:
   receive current or voltage readings, in real time, from the at least one over the data communication bus from the first controller; and
   provide the current or voltage readings, in real time on the at least one diagnostic screen.

8. The vehicle of claim 1, wherein the vehicle interface controller is operatively coupled to at least one fuse box in the vehicle and the vehicle interface controller is further configured to:
   monitor inputs and outputs of the at least one fuse box in the vehicle;
   detect a failure corresponding to one or more blown fuses in the at least one fuse box; and
   generate at least one of a fault alert screen or a fuse fault detail screen after detecting the failure.

9. The vehicle of claim 1, wherein the vehicle interface controller is further configured to receive a soot input indicative of the soot level for the vehicle on the data communication bus.

10. The vehicle of claim 1, wherein the vehicle interface controller is further configured to display the soot level on a gauge alert screen after the no distraction screen has been removed.

11. The vehicle of claim 10, wherein the vehicle interface controller is further configured to display the soot level on the gauge alert screen when the park brake is disabled.

12. The vehicle of claim 11, wherein the vehicle interface controller is further configured to display the soot level on the gauge alert screen when the park brake is active.

13. An apparatus for use in a vehicle, the apparatus comprising:
   a memory; and
   a vehicle interface controller including the memory and being configured to:
      receive first data indicative of one or more failures related to a vehicle operation on a data communication bus from a first controller that controls a vehicle operation and that detects the one or more failures related to the vehicle operation;
      receive a signal corresponding to at least one of vehicle speed or park brake status;
      access the memory to retrieve at least one diagnostic screen that corresponds to the one or more failures indicated on the first data; and
      display the at least one diagnostic screen after the signal indicates the at least one of the vehicle speed being equal to a predetermined vehicle speed or the park brake status indicating that a park brake is set in the vehicle,
      wherein the vehicle interface controller is further configured to:
         provide a no distraction screen that identifies first level information including at least one of a distance driven by the vehicle or a duration of time an engine of the vehicle is running to minimize driver distraction;

monitor for a soot level of the vehicle while the vehicle interface controller provides the no distraction screen; and remove the no distraction screen and display a warning indicative of a high soot level in response to the soot level exceeding a predetermined limit.

14. The apparatus of claim 13, wherein the first data includes at least one diagnostic trouble code (DTC) that is indicative of the one or more failures.

15. The apparatus of claim 14, wherein the vehicle interface controller is further configured to retrieve the at least one diagnostic screen from the memory based on the at least one DTC.

16. The apparatus of claim 14, wherein the vehicle interface controller is further configured to:

receive current or voltage readings, in real time, from the data communication bus from the first controller; and provide the current or voltage readings, in real time on the at least one diagnostic screen.

17. The apparatus of claim 14, wherein the vehicle interface controller is operatively coupled to at least one fuse box in the vehicle and the vehicle interface controller is further configured to:

monitor inputs and outputs of the at least one fuse box in the vehicle;

detect a failure corresponding to one or more blown fuses in the at least one fuse box; and generate at least one of a fault alert screen or a fuse fault detail screen after detecting the failure.

18. A computer-program product embodied in a non-transitory computer read-able medium that is programmed for providing diagnostics in a vehicle, the computer-program product comprising instructions for:

receiving first data indicative of one or more failures related to a vehicle operation on a data communication bus from a first controller that controls a vehicle operation and that detects the one or more failures related to the vehicle operation;

receiving a signal corresponding to at least one of vehicle speed or park brake status;

accessing a look up table to retrieve at least one diagnostic screen that corresponds to the one or more failures indicated on the first data;

displaying the at least one diagnostic screen after the signal indicates at least one of the vehicle speed being equal to a predetermined vehicle speed or the park brake status indicating that a park brake is set in the vehicle;

providing a no distraction screen that identifies first level information including at least one of a distance driven by the vehicle or a duration of time an engine of the vehicle is running to minimize driver distraction;

monitoring for a soot level of the vehicle while providing the no distraction screen; and removing the no distraction screen to display a warning indicative of a high soot level in response to the soot level exceeding a predetermined limit.

19. The apparatus of claim 13, wherein the vehicle interface controller is further configured to display the soot level on a gauge alert screen after the no distraction screen has been removed.

20. The computer-program product of claim 18 further comprising displaying the soot level on a gauge alert screen after the no distraction screen has been removed.

* * * * *